(12) United States Patent
Ikeda

(10) Patent No.: US 10,930,313 B2
(45) Date of Patent: *Feb. 23, 2021

(54) MAGNETIC RECORDING MEDIUM WITH MULTIPLE EXCHANGE COUPLING LAYERS AND SMALL GRAIN MAGNETIC LAYERS

(71) Applicant: Western Digital Technologies, Inc., San Jose, CA (US)

(72) Inventor: Yoshihiro Ikeda, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 15/912,648

(22) Filed: Mar. 6, 2018

(65) Prior Publication Data
US 2018/0197570 A1 Jul. 12, 2018

Related U.S. Application Data

(63) Continuation of application No. 14/644,633, filed on Mar. 11, 2015, now Pat. No. 9,934,808.

(51) Int. Cl.
*G11B 5/667* (2006.01)
*G11B 5/65* (2006.01)
*G11B 5/66* (2006.01)

(52) U.S. Cl.
CPC ............... *G11B 5/667* (2013.01); *G11B 5/65* (2013.01); *G11B 5/656* (2013.01); *G11B 5/66* (2013.01)

(58) Field of Classification Search
CPC .. G11B 5/65; G11B 5/656; G11B 5/66; G11B 5/667
See application file for complete search history.

(56) References Cited

U.S. PATENT DOCUMENTS 8,168,310 B2 5/2012 Bian et al.
8,241,766 B2 8/2012 Lu et al.
(Continued)

OTHER PUBLICATIONS

Choe et al., "Control of Exchange Coupling Between Granular Oxide and Highly Exchange Coupled Cap Layers and the Effect on Perpendicular Magnetic Switching and Recording Characteristics," IEEE Transactions on Magnetics, vol. 45, No. 6, Jun. 2009, pp. 2694-2700.

(Continued)

*Primary Examiner* — Holly Rickman
(74) *Attorney, Agent, or Firm* — Vierra Magen Marcus LLP

(57) ABSTRACT

According to one embodiment, a magnetic recording medium includes: a substrate; and a magnetic recording layer structure formed above the substrate. The magnetic recording layer structure includes five or more magnetic recording layers and four or more nonmagnetic exchange coupling layers, where the magnetic recording layers and the nonmagnetic exchange coupling layers are arranged in an alternating pattern, and where the magnetic recording layers are separated from each other by least one of the nonmagnetic exchange coupling layers. The magnetic recording layer positioned closest to the substrate has each of the following: an average magnetic grain pitch of about 8.3 nm or less, a magnetic anisotropy field ($H_k$) value of greater than or equal to about 20 kOe, and a thickness that is about 40% of a total thickness of the magnetic recording layer structure.

11 Claims, 17 Drawing Sheets

(56) References Cited

U.S. PATENT DOCUMENTS

| | | |
|---|---|---|
| 8,460,805 B1 | 6/2013 | Gao et al. |
| 8,630,060 B2 | 1/2014 | Mosendz et al. |
| 8,685,547 B2 | 4/2014 | Bian et al. |
| 8,940,418 B1 | 1/2015 | Van Ek |
| 9,129,638 B1 | 9/2015 | Choe et al. |
| 9,552,837 B2 | 1/2017 | Do et al. |
| 2008/0144213 A1 | 6/2008 | Berger et al. |
| 2011/0003175 A1 | 1/2011 | Valcu et al. |
| 2012/0026626 A1 | 2/2012 | Nolan et al. |
| 2012/0251846 A1 | 10/2012 | Desai et al. |
| 2014/0104724 A1 | 4/2014 | Shiroishi et al. |

OTHER PUBLICATIONS

Choe et al., "Magnetic Switching Behavior of Granular Perpendicular Magnetic Media with Different Lateral and Vertical Exchange Coupling," IEEE Transactions on Magnetics, 3202604, vol. 50, No. 11, Nov. 2014, pp. 1-4.

Ikeda et al., "Magnetic Cluster Size 'Knee' Analysis for Small Grain Continuous Media," IEEE Transactions on Magnetics, vol. 48, No. 11, Nov. 2012, pp. 3185-3187.

Non-Final Office Action on U.S. Appl. No. 14/644,633 dated Aug. 10, 2017.

Notice of Allowance on U.S. Appl. No. 14/644,633 dated Nov. 17, 2017.

Tang et al., "A Study of Perpendicular Magnetic Recording Media With an Exchange Control Layer," IEEE Transactions on Magnetics, vol. 44, No. 11, Nov. 2008, pp. 3507-3510.

Wang et al., "Exchange Coupled Composite Media for Perpendicular Magnetic Recording," IEEE Transactions on Magnetics, vol. 41, No. 10, Oct. 2005, pp. 3181-3186.

U.S. Appl. No. 16/904,400, filed Jun. 17, 2020.

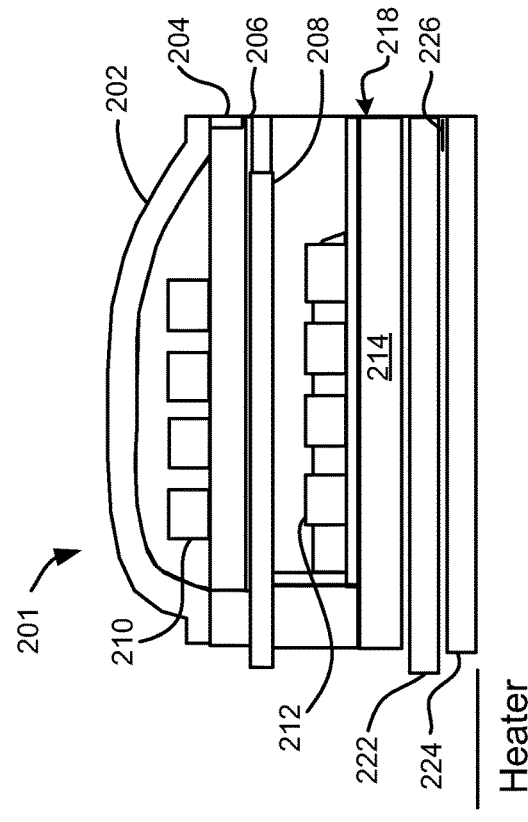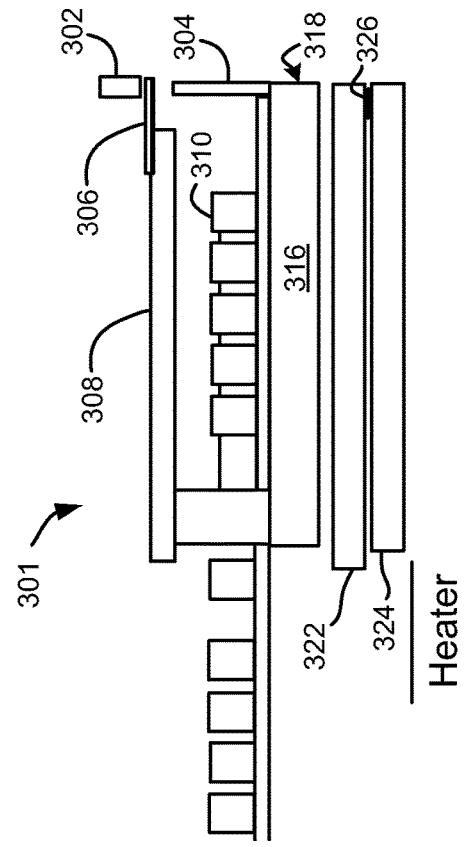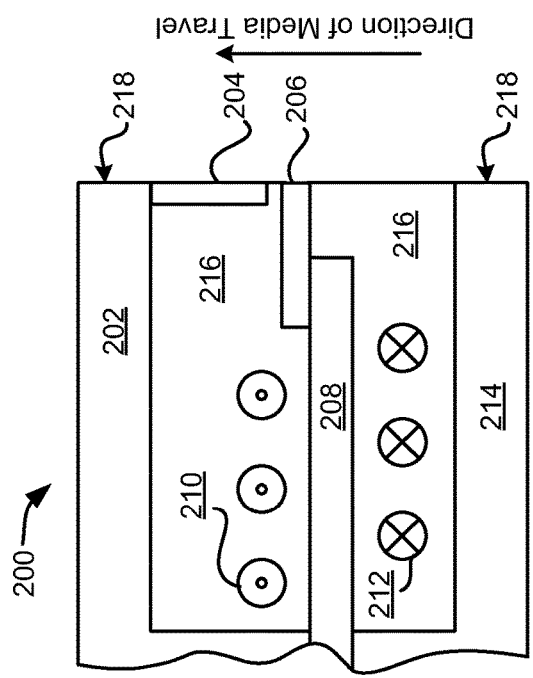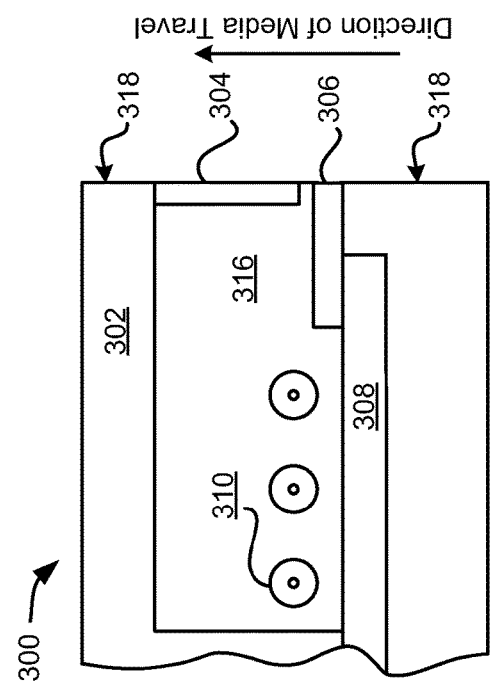

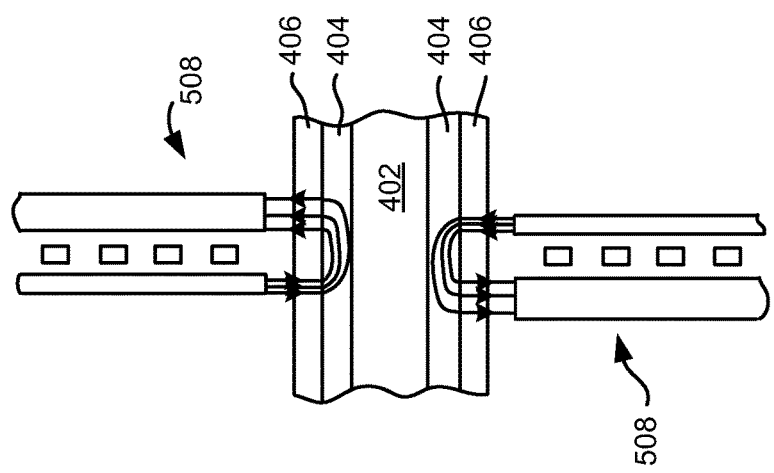
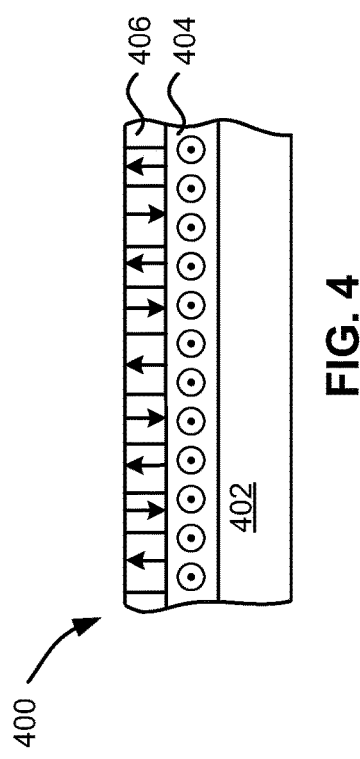
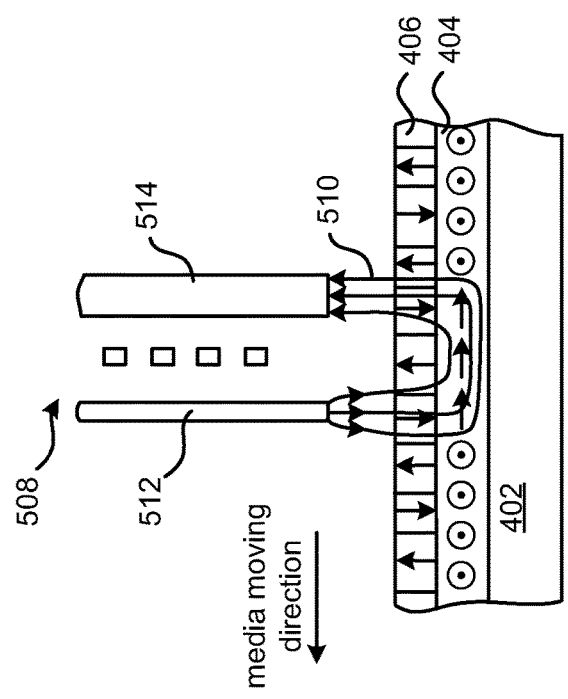

MAGNETIC RECORDING MEDIUM WITH MULTIPLE EXCHANGE COUPLING LAYERS AND SMALL GRAIN MAGNETIC LAYERS

CROSS REFERENCE TO RELATED APPLICATIONS

This application is a continuation application of U.S. patent application Ser. No. 14/644,633, filed on Mar. 11, 2015, the entirety of which is incorporated by reference herein.

FIELD

The present application relates to magnetic recording media, and more specifically, this invention relates to a recording layer structure having small grain magnetic recording layers separated by exchange coupling layers, which may be of particular use in perpendicular magnetic recording (PMR) media, shingle-written magnetic recording (SMR) media, and magnetic field-assisted magnetic recording (MAMR) media.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. Accordingly, an important and ongoing goal involves increasing the amount of information able to be stored in the limited area and volume of HDDs. Increasing the areal recording density of HDDs provides one technical approach to achieve this goal. In particular, reducing the size of recording bits and components associated therewith offers an effective means to increase areal recording density.

However, the continual push to miniaturize the recording bits and associated components presents its own set of challenges and obstacles. For instance, as the size of the ferromagnetic crystal grains in a magnetic recording layer become smaller and smaller, the crystal grains may become thermally unstable, such that thermal fluctuations result in magnetization reversal and the loss of recorded data. Increasing the magnetic anisotropy of the magnetic particles may improve the thermal stability thereof, yet ultimately reduce the ability to write information thereto. Accordingly, increasing the magnetic anisotropy of the magnetic particles may also require increasing the switching field needed to switch the magnetization of the magnetic particles during a write operation.

SUMMARY

According to one embodiment, a magnetic recording medium includes: a substrate; and a magnetic recording layer structure formed above the substrate. The magnetic recording layer structure includes: a first recording magnetic layer having a first magnetic anisotropy field ($H_k$) value greater than or equal to about 20 kOe; a first nonmagnetic exchange coupling layer formed above the first magnetic recording layer; a second magnetic recording layer formed above the first nonmagnetic exchange coupling layer, the second magnetic recording layer having a second $H_k$ value that is less than or about equal to the first $H_k$ value of the first magnetic recording layer; a second nonmagnetic exchange coupling layer formed above the second magnetic recording layer; a third magnetic recording layer formed above the second nonmagnetic exchange coupling layer, the third magnetic recording layer having a third $H_k$ value that is less than or about equal to the first $H_k$ value of the first magnetic recording layer; a third nonmagnetic exchange coupling layer formed above the third magnetic recording layer; a fourth magnetic recording layer formed above the third nonmagnetic exchange coupling layer, the fourth magnetic recording layer having a fourth $H_k$ value that is less than or about equal to the first $H_k$ value of the first magnetic recording layer; a fourth nonmagnetic exchange coupling layer formed above the fourth magnetic recording layer; and a fifth magnetic recording layer formed above the fourth nonmagnetic exchange coupling layer, the fifth magnetic recording layer having a fifth $H_k$ value that is less than or about equal to the first $H_k$ value of the first magnetic recording layer.

According to another embodiment, a magnetic recording medium includes: a substrate; and a magnetic recording layer structure formed above the substrate. The magnetic recording layer structure includes five or more magnetic recording layers and four or more nonmagnetic exchange coupling layers, where the magnetic recording layers and the nonmagnetic exchange coupling layers are arranged in an alternating pattern, and where the magnetic recording layers are separated from each other by least one of the nonmagnetic exchange coupling layers. The magnetic recording layer positioned closest to the substrate has each of the following: an average magnetic grain pitch of about 8.3 nm or less, a magnetic anisotropy field ($H_k$) value of greater than or equal to about 20 kOe, and a thickness that is about 40% of a total thickness of the magnetic recording layer structure.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a cross-sectional view of a perpendicular magnetic head with helical coils, according to one embodiment.

FIG. 2B is a cross-sectional view a piggyback magnetic head with helical coils, according to one embodiment.

FIG. 3A is a cross-sectional view of a perpendicular magnetic head with looped coils, according to one embodiment.

FIG. 3B is a cross-sectional view of a piggyback magnetic head with looped coils, according to one embodiment.

FIG. 4 is a schematic representation of a perpendicular recording medium, according to one embodiment.

FIG. 5A is a schematic representation of a recording head and the perpendicular recording medium of FIG. 4, according to one embodiment.

FIG. 5B is a schematic representation of a recording apparatus configured to record separately on both sides of a perpendicular recording medium, according to one embodiment.

DETAILED DESCRIPTION

Figure 1:
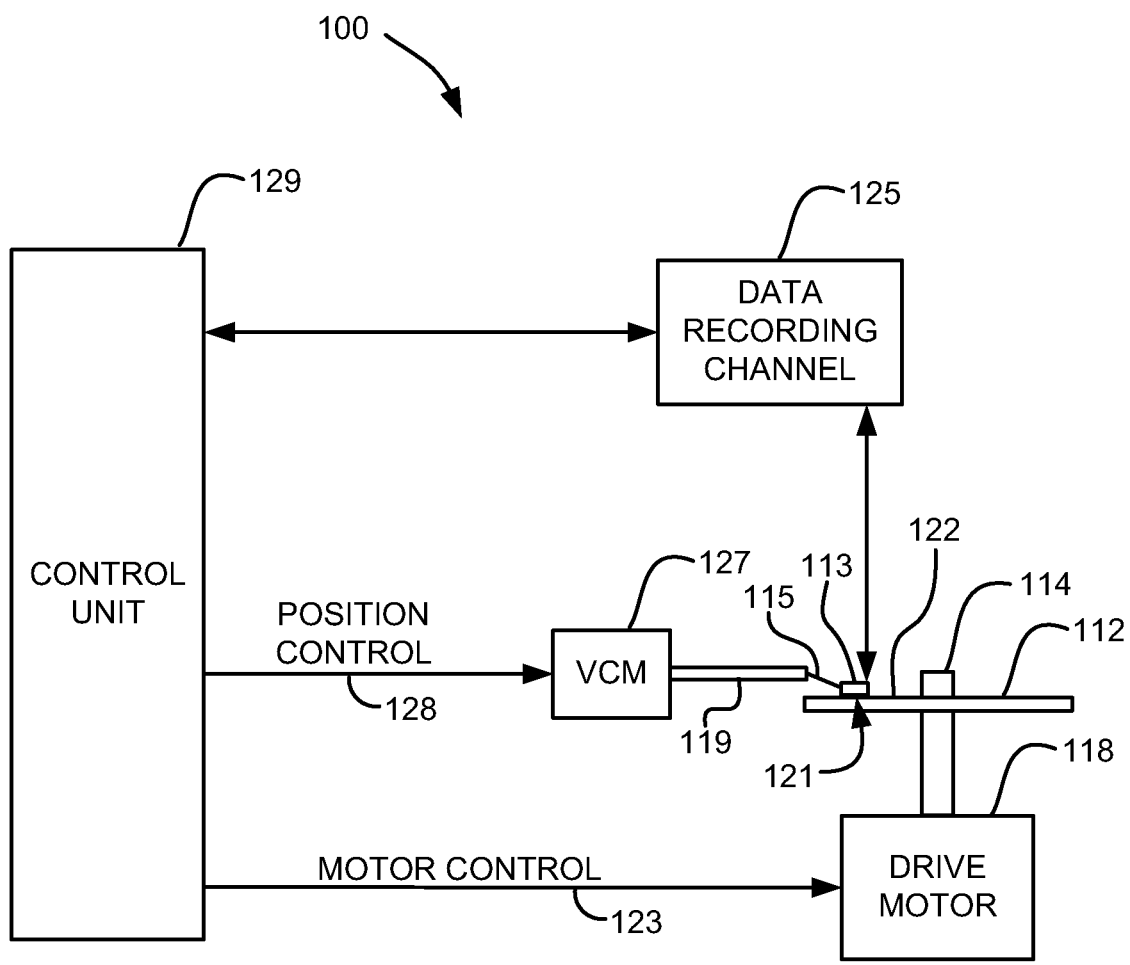
FIG. 1 is a simplified drawing of a magnetic recording disk drive system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems and/or related systems and methods, as well as operation and/or component parts thereof.

In one general embodiment, a magnetic recording medium includes: a substrate; and a magnetic recording layer structure formed above the substrate. The magnetic recording layer structure includes: a first recording magnetic layer having a first magnetic anisotropy field ($H_k$) value greater than or equal to about 20 kOe; a first nonmagnetic exchange coupling layer formed above the first magnetic recording layer; a second magnetic recording layer formed above the first nonmagnetic exchange coupling layer, the second magnetic recording layer having a second $H_k$ value that is less than or about equal to the first $H_k$ value of the first magnetic recording layer; a second nonmagnetic exchange coupling layer formed above the second magnetic recording layer; a third magnetic recording layer formed above the second nonmagnetic exchange coupling layer, the third magnetic recording layer having a third $H_k$ value that is less than or about equal to the first $H_k$ value of the first magnetic recording layer; a third nonmagnetic exchange coupling layer formed above the third magnetic recording layer; a fourth magnetic recording layer formed above the third nonmagnetic exchange coupling layer, the fourth magnetic recording layer having a fourth $H_k$ value that is less than or about equal to the first $H_k$ value of the first magnetic recording layer; a fourth nonmagnetic exchange coupling layer formed above the fourth magnetic recording layer; and a fifth magnetic recording layer formed above the fourth nonmagnetic exchange coupling layer, the fifth magnetic recording layer having a fifth $H_k$ value that is less than or about equal to the first $H_k$ value of the first magnetic recording layer.

In another general embodiment, a magnetic recording medium includes: a substrate; and a magnetic recording layer structure formed above the substrate. The magnetic recording layer structure includes five or more magnetic recording layers and four or more nonmagnetic exchange coupling layers, where the magnetic recording layers and the nonmagnetic exchange coupling layers are arranged in an alternating pattern, and where the magnetic recording layers are separated from each other by least one of the nonmagnetic exchange coupling layers. The magnetic recording layer positioned closest to the substrate has each of the following: an average magnetic grain pitch of about 8.3 nm or less, a magnetic anisotropy field ($H_k$) value of greater than or equal to about 20 kOe, and a thickness that is about 40% of a total thickness of the magnetic recording layer structure.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. The disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

FIG. 4 provides a schematic diagram of a simplified perpendicular recording medium 400, which may also be used with magnetic disk recording systems, such as that shown in FIG. 1. As shown in FIG. 4, the perpendicular recording medium 400, which may be a recording disk in various approaches, comprises at least a supporting substrate 402 of a suitable non-magnetic material (e.g., glass, aluminum, etc.), and a soft magnetic underlayer 404 of a material having a high magnetic permeability positioned above the substrate 402. The perpendicular recording medium 400 also includes a magnetic recording layer 406 positioned above the soft magnetic underlayer 404, where the magnetic recording layer 406 preferably has a high coercivity relative to the soft magnetic underlayer 404. There may one or more additional layers (not shown), such as an "exchange-break" layer or "interlayer", between the soft magnetic underlayer 404 and the magnetic recording layer 406.

The orientation of magnetic impulses in the magnetic recording layer 406 is substantially perpendicular to the surface of the recording layer. The magnetization of the soft magnetic underlayer 404 is oriented in (or parallel to) the plane of the soft underlayer 404. As particularly shown in FIG. 4, the in-plane magnetization of the soft magnetic underlayer 404 may be represented by an arrow extending into the paper.

FIG. 5A illustrates the operative relationship between a perpendicular head 508 and the perpendicular recording medium 400 of FIG. 4. As shown in FIG. 5A, the magnetic flux 510, which extends between the main pole 512 and return pole 514 of the perpendicular head 508, loops into and out of the magnetic recording layer 406 and soft magnetic underlayer 404. The soft magnetic underlayer 404 helps focus the magnetic flux 510 from the perpendicular head 508 into the magnetic recording layer 406 in a direction generally perpendicular to the surface of the magnetic medium. Accordingly, the intense magnetic field generated between the perpendicular head 508 and the soft magnetic underlayer 404, enables information to be recorded in the magnetic recording layer 406. The magnetic flux is further channeled by the soft magnetic underlayer 404 back to the return pole 514 of the head 508.

As noted above, the magnetization of the soft magnetic underlayer 404 is oriented in (parallel to) the plane of the soft magnetic underlayer 404, and may represented by an arrow extending into the paper. However, as shown in FIG. 5A, this in plane magnetization of the soft magnetic underlayer 404 may rotate in regions that are exposed to the magnetic flux 510.

FIG. 5B illustrates one embodiment of the structure shown in FIG. 5A, where soft magnetic underlayers 404 and magnetic recording layers 406 are positioned on opposite sides of the substrate 402, along with suitable recording heads 508 positioned adjacent the outer surface of the magnetic recording layers 406, thereby allowing recording on each side of the medium.

Except as otherwise described herein with reference to the various inventive embodiments, the various components of the structures of FIGS. 1-5B, and of other embodiments disclosed herein, may be of conventional material(s), design, and/or fabricated using conventional techniques, as would become apparent to one skilled in the art upon reading the present disclosure.

Figure 6:
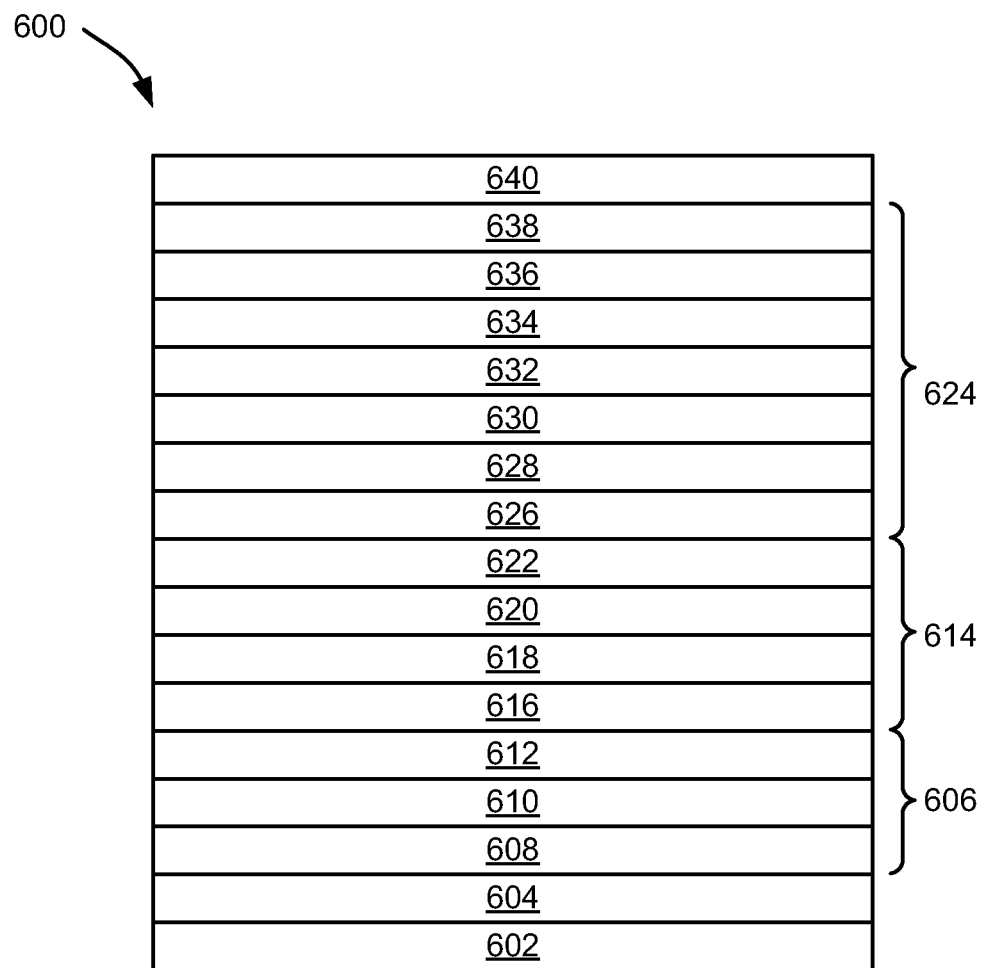
FIG. 6 is a schematic representation of a perpendicular magnetic recording medium comprising three exchange coupling layers, according to one embodiment.

Referring now to FIG. 6, a perpendicular magnetic recording medium 600 comprising a recording layer structure having three exchange coupling layers is shown according to one embodiment. As an option, the perpendicular magnetic recording medium 600 may be implemented in conjunction with features from any other embodiment listed herein, such as those described with reference to the other FIGS. Of course, the perpendicular magnetic recording medium 600 and others presented herein may be used in various applications and/or in permutations which may or may not be specifically described in the illustrative embodiments listed herein. For instance, the perpendicular magnetic recording medium 600 may include more or less layers than those shown in FIG. 6, in various approaches. Moreover, unless otherwise specified, formation of one or more of the layers shown in FIG. 6 may be achieved via atomic layer deposition (ALD), chemical vapor deposition (CVD), evaporation, e-beam evaporation, ion beam deposition, sputtering, or other deposition technique as would become apparent to a skilled artisan upon reading the present disclosure. Further, the perpendicular magnetic recording medium 600 and others presented herein may be used in any desired environment.

As shown in FIG. 6, the perpendicular magnetic recording medium 600 includes a substrate 602 comprising a material of high rigidity, such as glass, Al, $Al_2O_3$, AlMg, MgO, Si, or other suitable substrate material as would be understood by one having skill in the art upon reading the present disclosure. In some approaches, the substrate 602 may have a thickness that is greater than or less than the other layers formed thereon.

The perpendicular magnetic recording medium 600 also includes an adhesion layer 604 formed above the substrate 602, the adhesion layer 604 being configured to improve adhesion between the substrate 602 and the layers deposited thereon. The adhesion layer 604 may also be configured to control the size of the magnetic grains in one or more of the layers of the magnetic recording layer structure 624. In preferred approaches, the adhesion layer 604 comprises an amorphous material that does not affect the crystal orientation of the layers deposited thereon. Suitable materials for the adhesion layer 604 include, but are not limited to, Ni, Co, Al, Ti, Cr, Zr, Ta, Nb and combinations and/or alloys thereof.

The perpendicular magnetic recording medium 600 additionally includes a soft magnetic underlayer structure 606 formed above the adhesion layer 604, the soft magnetic underlayer structure 606 being configured to promote data recording in one or more of the magnetic recording layers of the magnetic recording layer structure 624 by suppressing the spread of the magnetic field and efficiently magnetizing the one or more magnetic recording layers. As shown in FIG. 6, the soft magnetic underlayer structure 606 includes a first soft magnetic underlayer 608 and a second soft magnetic underlayer 612 separated by an anti-ferromagnetic coupling (AFC) layer 610, typically of Ru or other AFC material as known in the art. The first and second soft magnetic underlayers 608, 612 may each independently be comprised of cobalt, iron, tantalum, zirconium, nickel, boron, chromium, or compositions thereof, etc., which preferably provide a high moment.

An exchange break layer structure 614 is formed above the soft magnetic underlayer structure 606, the exchange break layer structure 614 being configured to control the grain size and crystalline orientation of the layers formed thereabove, as well as magnetically decouple the magnetically permeable layers of the soft magnetic underlayer structure 606 and the magnetic recording layers of the magnetic recording layer structure 624. As shown in FIG. 6, the exchange break layer structure 614 includes a first exchange break layer 616, also referred to herein as a seed layer. The first exchange break layer 616 may include at least one of Ni, Cu, Pd, Pt, Cr, W, V, Mo, Ta, Nb, Fe, and other suitable materials as would become apparent to one skilled in the art upon reading the present disclosure.

The exchange break layer structure 614 also includes a second exchange break layer 618 formed above the first exchange break layer 616, and a third exchange break layer 620 formed above the second exchange break layer 618, where the second and third exchange break layers may also be referred to herein as underlayers. The second and third exchange break layers 618, 620 may include one or more materials having a hexagonal close packed (hcp) crystalline structure, such as Ru, or other such suitable material as would become apparent to one having skill in the art upon reading the present disclosure. In various approaches, the second and third exchange break layers 618, 620 may be formed under different gas pressures during sputtering, such as a lower pressure for the second exchange break layer 618, and higher pressures for the third exchange break layer 620.

The exchange break layer structure 614 further includes a fourth exchange break layer 622, which may be referred to herein as an onset layer, formed above the third exchange break layer 620. Suitable materials for the fourth exchange break layer 622 may include ruthenium, titanium, tantalum, and/or oxides thereof, etc.

As shown in FIG. 6, the magnetic recording layer structure 624 is formed above the exchange break layer structure 614, the magnetic recording layer structure 624 having four magnetic recording layers 626, 630, 634, 638 and three exchange coupling layers 628, 632, 636. In the embodiment depicted in FIG. 6, the magnetic recording layer structure 624 includes an alternating pattern of magnetic recording layers and exchange coupling layers. For instance, the magnetic recording layer structure 624 includes the first magnetic recording layer 626, the first exchange coupling layer 628 formed above the first magnetic recording layer 626, the second magnetic recording layer 630 formed above the first exchange coupling layer 628, the second exchange coupling layer 632 formed above the second magnetic recording layer 630, the third magnetic recording layer 634 formed above the second exchange coupling layer 632, the third exchange coupling layer 636 formed above the third magnetic recording layer 634, and the fourth magnetic recording layer 638 (also referred to as the cap layer 638) formed above the third exchange coupling layer 636.

The three lowermost magnetic recording layers 626, 630, 634 in the magnetic recording layer structure 624 each include a plurality of grains separated from one another via a segregant material. Illustrative materials for one or more of the magnetic recording layers 626, 630, 634 may include CoCrPtX+oxide and/or $O_2$, where X denotes one or more optional alloying elements such as B, Ta, Si, Ru, Ti, B, Cu, Ni, V, Mo, Mn, etc., and where the oxide may be $TiO_x$, $SiO_x$, $B_2O_3$, $W_2O_5$, $Ta_2O_5$, $NbO_2$, CoO, $Co_3O_4$, etc.

The thickness of the first magnetic recording layer 626 may typically be in a range from 4 nm to 5.5 nm. It has been found that for magnetic recording layer structures having four magnetic recording layers and three exchange coupling layers, such as the magnetic recording layer structure 624 shown in FIG. 6, increasing the thickness of the lowermost magnetic recording layer (see e.g., the first magnetic recording layer 626) above 5.5 nm substantially reduces or completely precludes media writeability.

With continued reference to FIG. 6, the thicknesses of the second and third magnetic recording layers 630, 634 may each independently be in a range from 0.5 nm to about 3 nm in various approaches. In some approaches, the second and third magnetic recording layers 630, 634 may have a thickness that is the same or different from one another. In one particular approach, the thickness of the second magnetic recording layer 630 may be about 2.8 nm, and the thickness of the third magnetic recording layer 634 may be about 1.2 nm.

In various approaches, the magnetic anisotropy, $K_u$, of the first magnetic recording layer 626 may be greater than the $K_u$ of the second magnetic recording layer 630. In more approaches, the magnetic anisotropy, $K_u$, of the first magnetic recording layer 626 may be greater than the $K_u$ of the second magnetic recording layer 630 and the $K_u$ of the third magnetic recording layer 634. In yet more approaches where the $K_u$ values of the first and third magnetic recording layers 626, 634 are greater than the $K_u$ of the second magnetic recording layer 630, the $K_u$ of the first magnetic recording layer 626 may be greater than or about equal to the $K_u$ of the third magnetic recording layer 634.

As noted previously, the magnetic recording layer structure 624 includes three exchange coupling layers 628, 632, 636 configured to magnetically decouple the magnetic recording layers 626, 630, 634, 638, as well as promote the grain growth and crystalline orientation of the layers formed thereabove. Each of the exchange coupling layers 628, 632, 636 may include a plurality of grains separated from one another via a segregant material. Moreover, each of the exchange coupling layers 628, 632, 636 are preferably nonmagnetic.

In preferred approaches, one or more of the exchange coupling layers 628, 632, 636 may include one or more of the same materials as one or more of the magnetic recording layers 626, 630, 634, though not necessarily in the same stoichiometric proportions given that the exchange coupling layers 628, 632, 636 are preferably nonmagnetic. For instance, in one preferred approach, one or more of the exchange coupling layers 628, 632, 636 may include CoCrPtX+oxide and/or O, where X denotes one or more optional alloying elements such as B, Ta, Si, Ru, Ti, B, Cu, Ni, V, Mo, Mn, etc., and where the oxide may be $TiO_x$, $SiO_x$, $B_2O_3$, $W_2O_5$, $Ta_2O_5$, $NbO_2$, CoO, $Co_3O_4$, etc.

In various approaches, the thicknesses of the exchange coupling layers 628, 632, 636, may each independently be in a range from 0.5 nm to 2 nm. In some approaches, some or all of the exchange coupling layers 628, 632, 636 may have thicknesses that are the same or different relative to one another.

As additionally shown in FIG. 6, the fourth magnetic recording layer 638, also referred to as a cap layer, is the uppermost layer in the magnetic recording layer structure 624. Suitable materials for the cap layer 638 may include, but are not limited to, a Co-, CoCr-, CoPtCr-, and/or CoPtCrB-based alloy, or other such material as would become apparent to one having skill in the art upon reading the present disclosure. In various approaches, the cap layer 638 may be a continuous cap layer. In some approaches, the cap layer 638 may be a continuous, partially oxidized cap layer formed by flowing a mixture of oxygen and argon to distribute the oxygen in the cap layer. In particular approaches, the cap layer 638 may be formed at a lower argon pressure than all other magnetic recording layers positioned therebelow, thus forming a cap layer that is continuous, or at least more continuous than all other magnetic recording layers in the magnetic recording layer structure 624.

As also shown in FIG. 6, a protective overcoat layer 640 is formed above the cap layer 638. Suitable materials for the overcoat layer 640 may include, but are not limited to, diamond-like carbon, carbon nitride, Si-nitride, BN or B4C, etc.

An optional lubricant layer (not shown in FIG. 6) may be formed above the protective overcoat layer 640. Suitable materials for the optional lubricant layer may also include, but are not limited to, perfluoropolyether, fluorinated alcohol, fluorinated carboxylic acids, etc.

As noted previously, efforts are continually made to increase the areal recording density of magnetic media. Areal density, e.g., as measured in bits per square inch, may be defined as the product of the track density (the tracks per inch radially on the magnetic medium, such as a disk) and the linear density (the bits per inch along each track). For a disk, the bits are written closely-spaced to form circular tracks on the disk surface, where each of the bits may comprise an ensemble of magnetic grains.

An important factor relevant to track density is the magnetic core width (MCW). The magnetic core width corresponds to the width of a magnetic bit recorded by the write pole of the write head. Thus, the smaller the magnetic core width, the greater the number of tracks of data that can be written to the media. Stated another way, high track density is associated with a narrow magnetic core width.

Moreover, an important factor relevant to linear density is the signal to noise ratio (SNR). Typically, a higher signal to noise ratio corresponds to a higher readable linear density. One approach to increase the signal to noise ratio involves reducing the size of the magnetic grains included within a magnetic recording layer. For instance, to support an areal density of 1 Tbit/in2 or more, the magnetic grain size needs to be reduced down to about an 8 nm pitch level. However, reducing the size of the magnetic grains may affect their thermal stability, represented as: $K_u V/k_B T$, where $K_u$ denotes the magnetocrystalline anisotropy, V is the average grain volume, $k_B$ denotes the Boltzmann constant, and T denotes the absolute temperature. To avoid thermal decay, $K_u V/k_B T$ should be greater than or equal to about 60, and is preferably greater than or equal to about 80.

To compensate for the reduction in volume, V, of the magnetic grains, the magnetic anisotropy ($K_u$) of the magnetic grains may be increased to maintain thermal stability. For instance, in one approach, a high $K_u$ portion of a magnetic recording layer structure, which may typically be the lowermost portion of the magnetic recording layer structure (see e.g., the high $K_u$ magnetic recording layer 626 shown in FIG. 6), may be increased (e.g., the thickness of the high $K_u$ portion may be increased) to maintain thermal stability of the magnetic grains therein. However, such an increase in this high $K_u$ portion of a magnetic recording layer structure may decrease the media writeability (i.e., the ease at which information may be recording in the magnetic material).

Various embodiments disclosed herein overcome such drawbacks by providing perpendicular magnetic storage media comprising novel magnetic recording layer structures having at least five magnetic recording layers and at least four exchange coupling layers. In preferred approaches, the lowermost magnetic recording layer in these novel magnetic recording layer structures has a high magnetic anisotropy (e.g., a magnetic anisotropy field, $H_k$, greater than or equal to about 20 kOe), a film thickness greater than or equal to about 6 nm, preferably in a range from about 6 nm to about 8 nm, and an average grain pitch of about 8.3 nm or less, thus leading to small, yet thermally stable magnetic grains. Moreover, it has been surprisingly and unexpectedly found that these novel magnetic recording layer structures having at least five magnetic recording layers and at least four exchange coupling layers exhibit improved magnetic recording characteristics (e.g., signal-to-noise ratio (SNR), overwrite (OW), magnetic core width (MCW), etc.) as compared to magnetic recording layer structures having no more than four magnetic recording layers and no more than three exchange coupling layers (e.g., as shown in FIG. 6). The superior magnetic recording characteristics, such as the OW, exhibited by these novel magnetic recording layer structures is indeed surprising and unexpected given the overall increase in the thickness of said magnetic recording layer structures (e.g., via addition of at least one additional magnetic recording layer and at least one additional exchange coupling layer, and incorporation of a thick, high $K_u$ lowermost magnetic recording layer).

In more approaches, superior magnetic recording characteristics (e.g., SNR, OW, MCW, etc.) may also be achieved in approaches where these novel magnetic recording structures, e.g., those having at least five magnetic recording layers and at least four exchange coupling layers, are formed above an antiferromagnetically-coupled soft magnetic underlayer structure having a thickness less than or equal to about 35 nm, preferably less than or equal to about 25 nm. In yet more approaches, superior magnetic recording characteristics may additionally be achieved in approaches where these novel magnetic recording structures are formed above, and preferably directly on, an exchange break layer structure having a thickness less than or equal to about 15 nm.

Figure 7A:
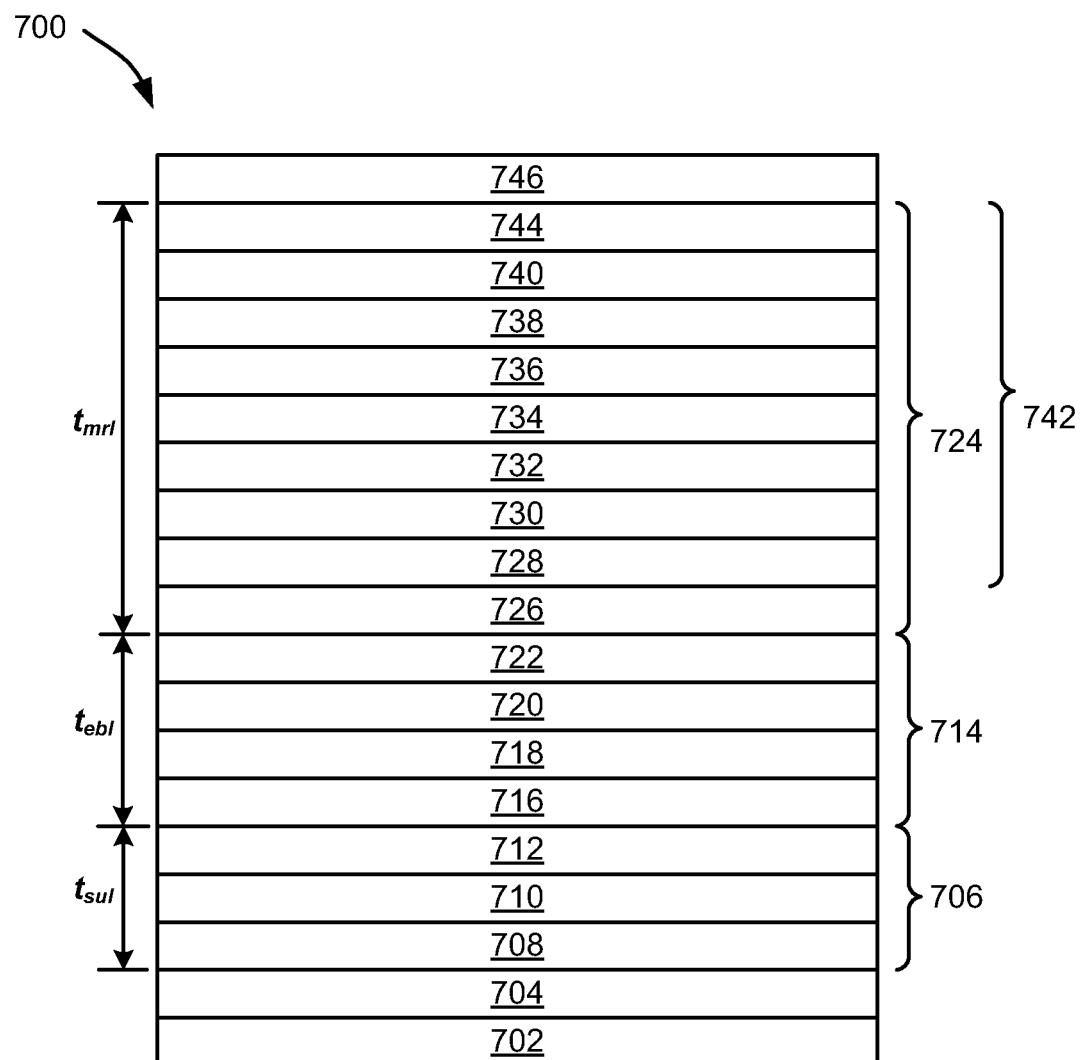
FIG. 7A is a schematic representation of a perpendicular magnetic recording medium comprising at least four exchange coupling layers, according to one embodiment.
Figure 7B:
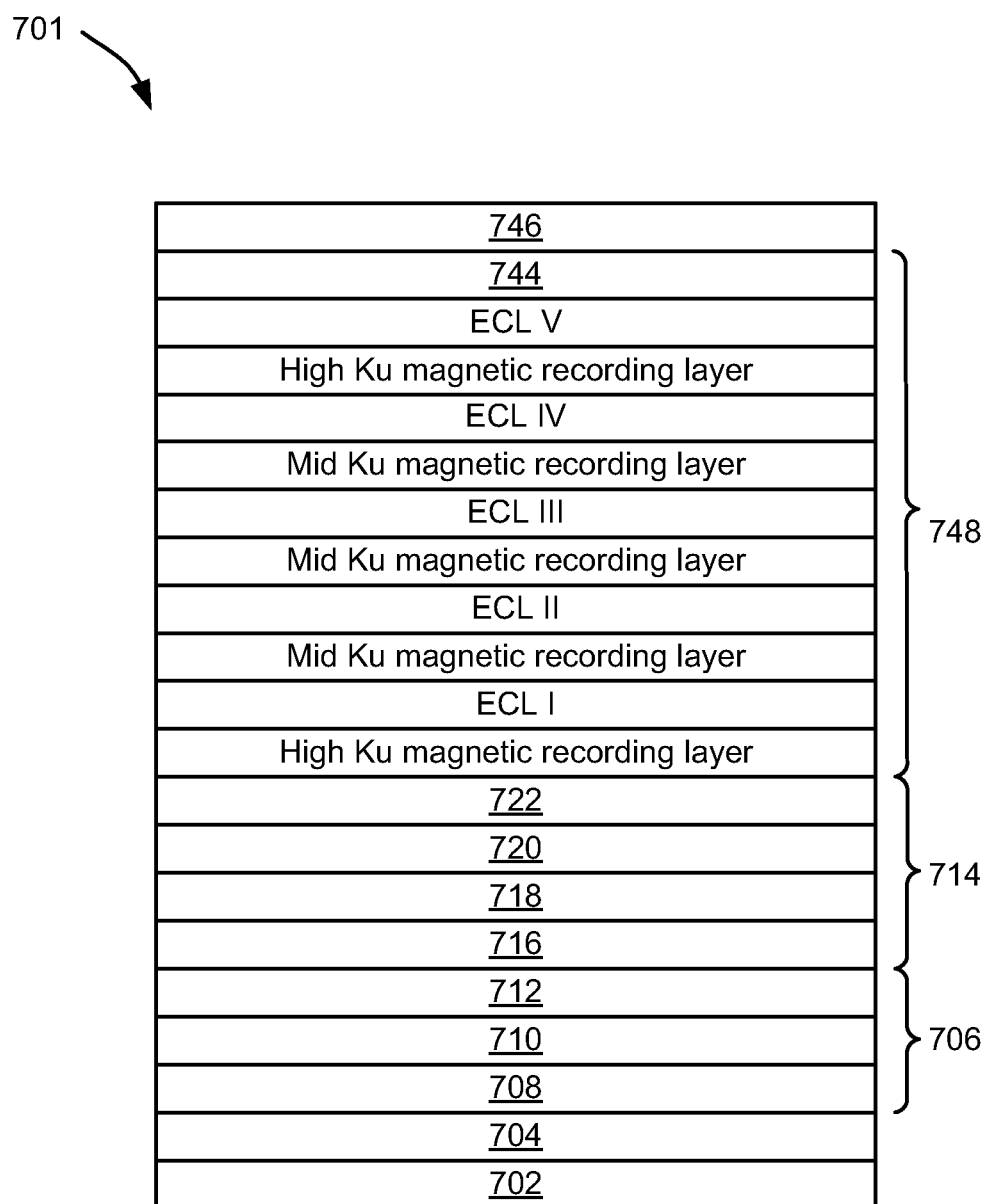
FIG. 7B is a schematic representation of a perpendicular magnetic recording medium comprising at least five exchange coupling layers, according to one embodiment.
Figure 8:
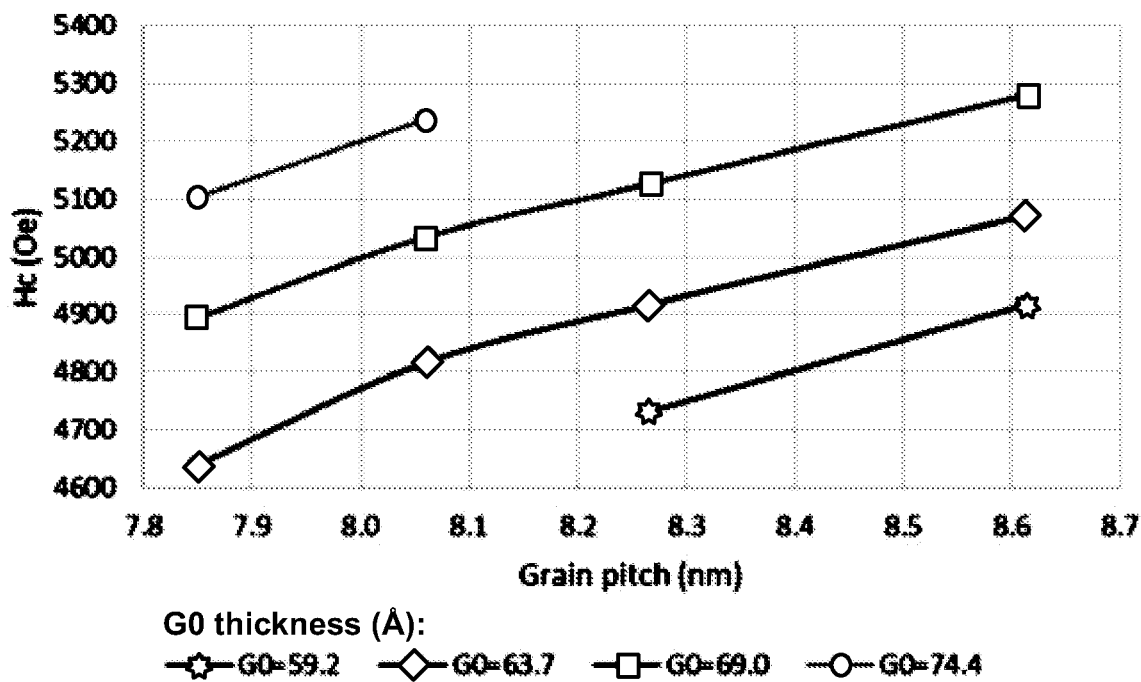
FIG. 8 is a plot of the coercivity ($H_c$) versus media grain pitch for various quad exchange coupling layer (ECL) structures having different G0 thicknesses. As used herein in various embodiments, a quad ECL structure refers to a perpendicular magnetic recording medium having a magnetic recording layer structure with four exchange coupling layers and five magnetic recording layers; whereas, a triple ECL structure refers to a perpendicular magnetic recording medium having a magnetic recording layer structure with three exchange coupling layers and four magnetic recording layers. As also used herein in various embodiments, the G0 layer corresponds to the lowermost magnetic recording layer in a quad ECL structure, whereas the G1 layer corresponds to the lowermost magnetic recording layer in a triple ECL structure.
Figure 9:
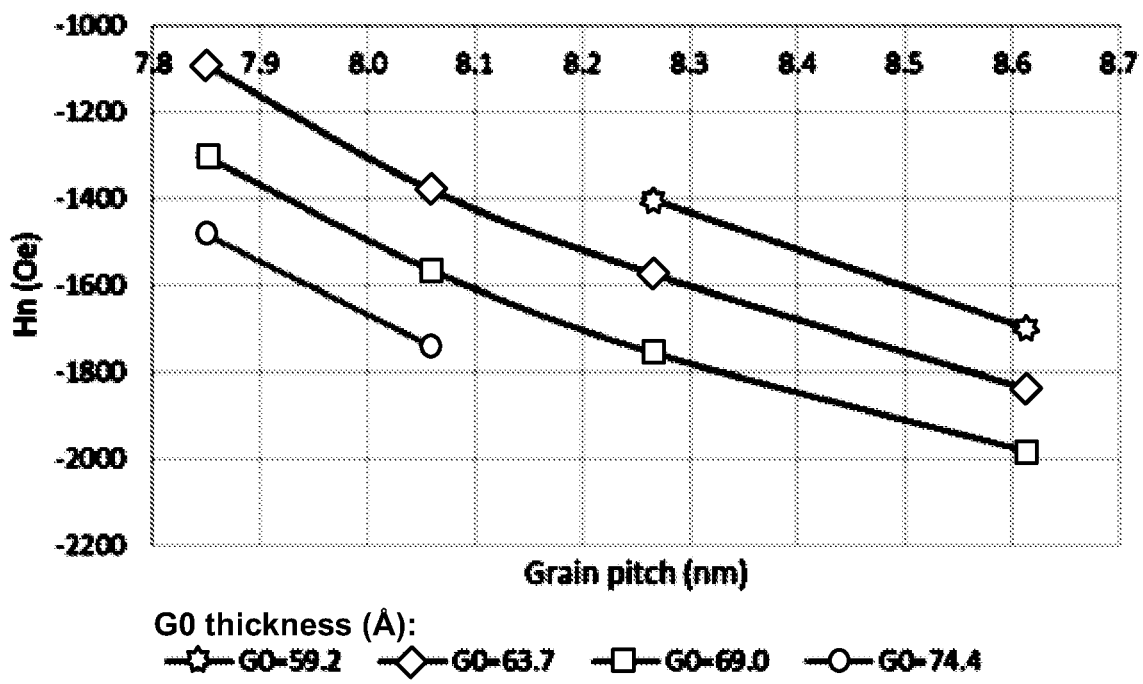
FIG. 9 is a plot of the nucleation field ($H_n$) versus media grain pitch for various quad ECL structures having different G0 thicknesses.
Figure 10:
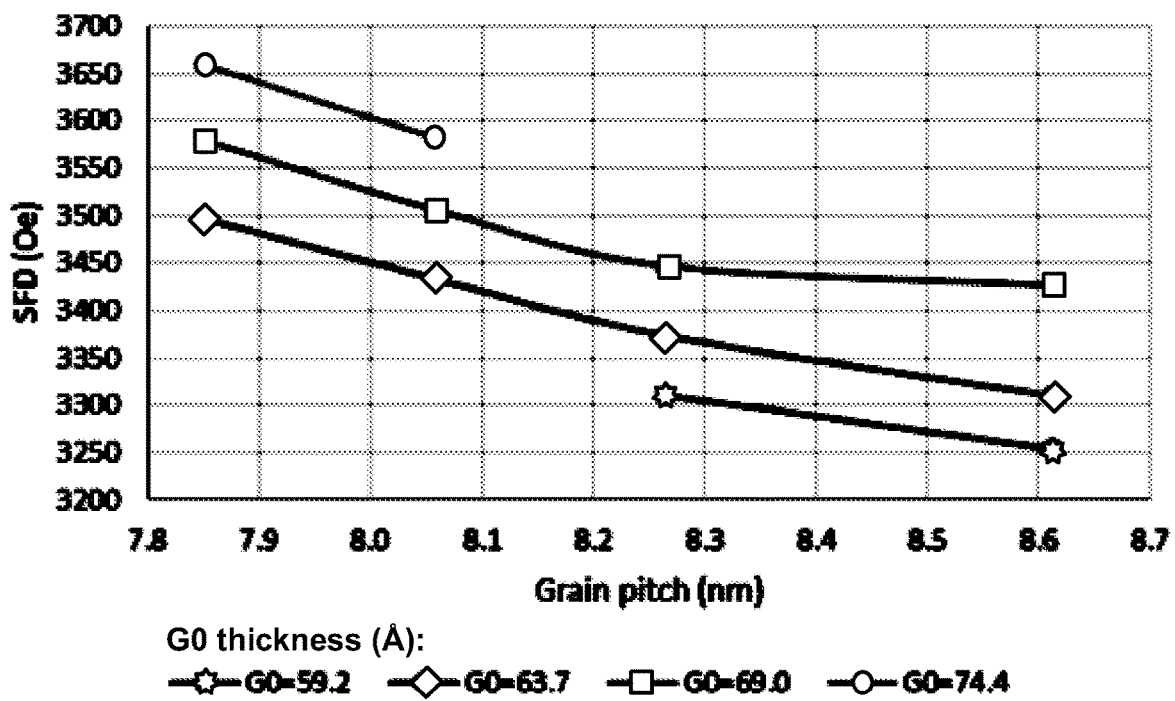
FIG. 10 is a plot of the switching field distribution (SFD) versus media grain pitch for various quad ECL structures having different G0 thicknesses.
Figure 11:
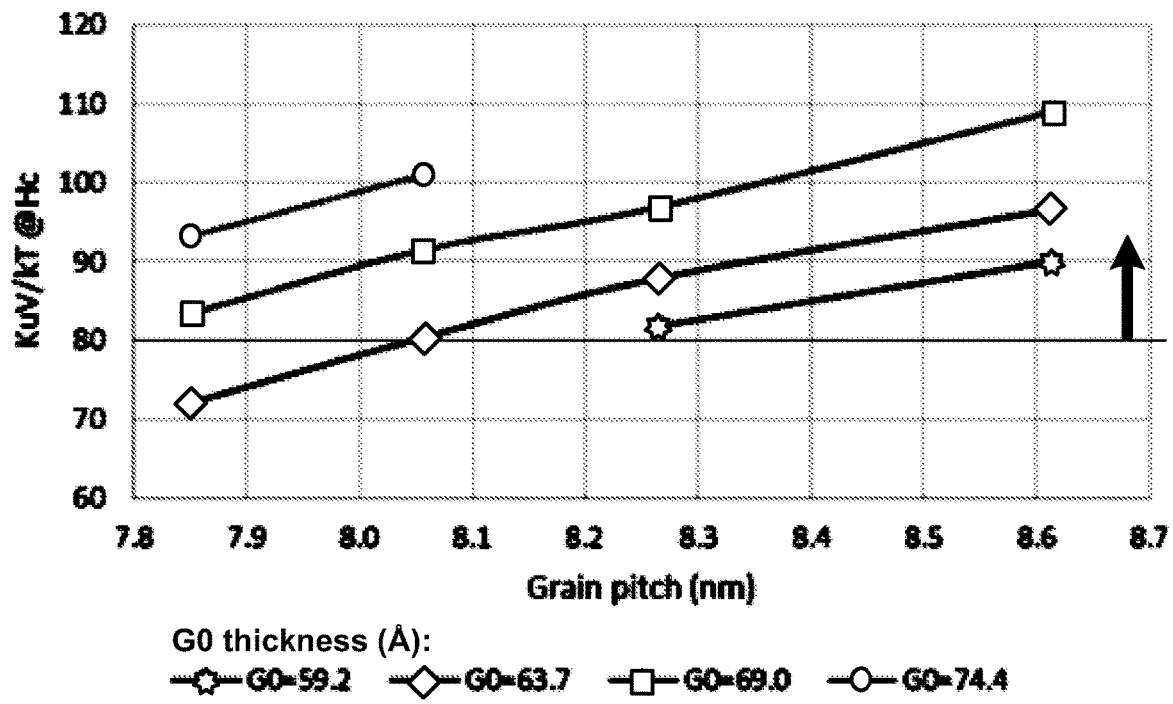
FIG. 11 is a plot of the thermal stability ($K_uV/k_BT$) versus media grain pitch for various quad ECL structures having different G0 thicknesses.

Referring now to FIGS. 7A-7B, perpendicular magnetic recording media 700, 701 each comprising a recording layer structure having at least four exchange coupling layers are shown according to one embodiment. As an option, the perpendicular magnetic recording media 700, 701 may be implemented in conjunction with features from any other embodiment listed herein, such as those described with reference to the other FIGS. Of course, the perpendicular magnetic recording media 700, 701 and others presented herein may be used in various applications and/or in permutations which may or may not be specifically described in the illustrative embodiments listed herein. For instance, the perpendicular magnetic recording media 700, 701 may include more or less layers than those shown in FIGS. 7A-7B, in various approaches. Moreover, unless otherwise specified, formation of one or more of the layers shown in FIGS. 7A-7B may be achieved via atomic layer deposition (ALD), chemical vapor deposition (CVD), evaporation, e-beam evaporation, ion beam deposition, sputtering, or other deposition technique as would become apparent to a skilled artisan upon reading the present disclosure. Further, the perpendicular magnetic recording media 700, 701 and others presented herein may be used in any desired environment.

As shown in FIG. 7A, the perpendicular magnetic recording medium 700 includes a substrate 702 comprising a material of high rigidity, such as glass, Al, $Al_2O_3$, AlMg, MgO, Si, or other suitable substrate material as would be understood by one having skill in the art upon reading the present disclosure. In some approaches, the substrate 702 may have a thickness that is greater than or less than the other layers formed thereon.

The perpendicular magnetic recording medium 700 also includes an adhesion layer 704 formed above the substrate 702. The adhesion layer 704 is configured to improve adhesion between the substrate 702 and the layers deposited thereon. The adhesion layer 704 may also be configured to control the size of the magnetic grains in one or more of the layers of the magnetic recording layer structure 724. In preferred approaches, the adhesion layer 704 comprises an amorphous material that does not affect the crystal orientation of the layers deposited thereon. Suitable materials for the adhesion layer 704 include, but are not limited to, Ni, Co, Al, Ti, Cr, Zr, Ta, Nb and combinations and/or alloys thereof. In particular approaches, the adhesion layer 704 may include at least one of TiAl, NiTa, TiCr, AlCr, NiTaZr, CoNbZr, TiAlCr, NiAlTi, CoAlTi, etc., or other suitable material as would become apparent to one having skill in the art upon reading the present disclosure. In more approaches, a thickness of the adhesion layer 704 may be in a range from about 1 nm to about 30 nm; however, as with any range pertaining to features shown in FIGS. 7A-7B, the upper and lower values could be higher or lower in various other approaches. In one preferred approach, the thickness of the adhesion layer 704 may be about 1.5 nm.

The perpendicular magnetic recording medium 700 additionally includes a soft magnetic underlayer structure 706. The soft magnetic underlayer structure 706 is configured to promote data recording in one or more of the magnetic recording layers of the magnetic recording layer structure 724 by suppressing the spread of the magnetic field and efficiently magnetizing the one or more magnetic recording layers. As shown in FIG. 7A, the soft magnetic underlayer structure 706 includes a coupling layer 710 sandwiched between a first soft magnetic underlayer 708 and a second soft magnetic underlayer 712, where the coupling layer 710 is configured to induce an anti-ferromagnetic coupling between the first and second soft magnetic underlayers 708, 712.

In various approaches, the first and/or second soft magnetic underlayers 708, 712 include one or more materials having a high magnetic permeability. Accordingly, suitable materials for the first and/or the second soft magnetic underlayers 708, 712 include, but are not limited to, amorphous alloys including Co and/or Fe as the main component(s), with at least one of: Ta, Hf, Nb, Si, Zr, B, C, Cr, Ni, etc. added thereto. Illustrative examples of suitable materials for the first and/or the second soft magnetic underlayers 708, 712 may include CoNiFe, FeCoB, CoCuFe, NiFe, FeAlSi, FeTaN, FeN, FeTaC, CoTaZr, CoFeTa, CoFeTaZr, CoFeB, CoZrNb, etc. Suitable materials for the coupling layer 710 include at least one of Ru, Ir, Cr, and other anti-ferromagnetic coupling materials as would become apparent to one skilled in the art upon reading the present disclosure.

The optimum thickness of the soft magnetic underlayer (SUL) structure 706 may depend on the material(s) of the first and second soft magnetic underlayers 708, 712 and/or the coupling layer 710, the structure and material(s) of the magnetic head configured to apply a magnetic field to the perpendicular magnetic recording medium 700, and/or the distance between the soft magnetic underlayer structure 706 and the magnetic recording layer structure 724, in various approaches. However, in some approaches, a total thickness, $t_{sul}$, of the soft magnetic underlayer structure 706 may be in a range from about 10 nm to about 50 nm, preferably in a range from about 12 nm to about 35 nm, even more preferably in a range from about 12 nm to about 15 nm. In more approaches, a thickness of the first soft magnetic underlayer 708 may be in a range from about 5 nm to about 25 nm. In yet more approaches, a thickness of the second soft magnetic underlayer 712 may be in a range from about 5 nm to about 25 nm. In still more approaches, a thickness of the coupling layer 710 may be in a range from about 0.5 nm to about 2 nm.

As further shown in FIG. 7A, the perpendicular magnetic recording medium 700 includes an exchange break layer (EBL) structure 714 positioned above the soft magnetic underlayer structure 706. The exchange break layer structure 714 is configured to magnetically decouple the magnetically permeable layers of the soft magnetic underlayer structure 706 and the magnetic recording layers of the magnetic recording layer structure 724. The exchange break layer structure 714 is also configured to control the grain size and crystalline orientation of the layers formed thereabove.

In various approaches, the exchange break layer structure 714 may include one or more layers. For example, in the embodiment depicted in FIG. 7A, the exchange break layer structure 714 may include at least four separate exchange break layers. In various approaches, a total thickness, $t_{ebl}$, of the exchange break layer structure 714 may be less than or equal to about 15 nm.

The first exchange break layer 716, also referred to herein as the seed layer, is configured to control the size of the magnetic grains in one or more of the layers of the magnetic recording layer structure 724. In some approaches, the first exchange break layer 716 may include one or more non-magnetic materials having a face centered cubic (fcc) crystalline structure. In particular approaches, the first exchange break layer 716 may include at least one of Ni, Cu, Pd, Pt, Cr, W, V, Mo, Ta, Nb, Fe, and other suitable materials as would become apparent to one skilled in the art upon reading the present disclosure. In more approaches, the first exchange break layer 716 may not include an oxide. In further approaches, the first exchange break layer 716 may have a thickness in a range from about 2 nm to about 8 nm.

The exchange break layer structure 714 also includes a second exchange break layer 718 formed above the first exchange break layer 716, and a third exchange break layer 720 formed above the second exchange break layer 718, where the second and third exchange break layers may also be referred to herein as underlayers. In various approaches, the second and/or third exchange break layers 718, 720 may be configured to control the crystalline orientation of the layers formed thereabove, particularly one or more of the layers of the magnetic recording layer structure 724. For instance, in one particular approach, the second and/or third exchange break layers 718, 720 may include one or more materials having a hexagonal close packed (hcp) crystalline structure that promotes the epitaxial growth of one or more of the layers of the magnetic recording layer structure 724 such that the c-axis of said layers is oriented substantially perpendicular to the upper surface thereof, thus resulting in perpendicular magnetic anisotropy.

In a preferred approach, the second and/or third exchange break layers 718, 720 may include Ru. In an even more preferred approach, the second and third exchange break layers 718, 720 may include Ru formed under different gas pressures during sputtering, e.g., a lower pressure for the second exchange break layer 718, and a higher pressure for the third exchange break layer 720. In additional approaches, the second and/or third exchange break layers 718, 720 may include Ru and a small amount of one or more of Ti, Ta, B, Cr or Si.

In more approaches, a thickness of the second and/or third exchange break layers 718, 720 may be in a range from about 3 nm to about 10 nm.

The exchange break layer structure 714 additionally includes a fourth exchange break layer 722 formed above the third exchange break layer 720. The fourth exchange break layer 722 may also be referred to herein as an onset layer. In various approaches, the fourth exchange break layer 722 may be configured to control the crystalline orientation and/or to promote the separation of the magnetic grains in one or more layers of the magnetic recording layer structure 724. In some approaches, the fourth exchange break layer 722 may also include one or more materials having a hexagonal close packed (hcp) crystalline structure, such as Ru. In preferred approaches, the fourth exchange break layer 722 may include Ru and at least one oxide, such as $TiO_2$, $Ti_2O_5$, $WO_3$, $W_2O_5$, $Ta_2O_5$, $SiO_2$, $B_2O_3$, etc. In more approaches, the fourth exchange break layer 722 may include Ru, at least one oxide, and a small amount of one or more of Ti, Ta, B, Cr and Si.

In further approaches, a thickness of the fourth exchange break layer 722 may be in a range from about 0.5 nm to about 2.0 nm. In numerous approaches, the fourth exchange break layer 722 may be substantially thinner than the second and/or third exchange break layers 718, 720.

As shown in FIG. 7A, the perpendicular magnetic recording medium 700 includes a magnetic recording layer structure 724 formed above the exchange break layer structure 714. In various approaches, the magnetic recording layer structure 724 may include one or more magnetic recording layers and one or more exchange coupling layers. For example, in the embodiment depicted in FIG. 7A, the magnetic recording layer structure 724 may include at least five magnetic recording layers 726, 730, 734, 738, 744, and at least four exchange coupling layers 728, 732, 736, 740. In such an embodiment, the magnetic recording layer structure 724 includes an alternating pattern of magnetic recording layers and exchange coupling layers. As particularly shown in FIG. 7A, the magnetic recording layer structure 724 includes the first magnetic recording layer 726, the first exchange coupling layer 728 formed above the first magnetic recording layer 726, the second magnetic recording layer 730 formed above the first exchange coupling layer 728, the second exchange coupling layer 732 formed above the second magnetic recording layer 730, the third magnetic recording layer 734 formed above the second exchange coupling layer 732, the third exchange coupling layer 736 formed above the third magnetic recording layer 734, the fourth magnetic recording layer 738 formed above the third exchange coupling layer 736, the fourth exchange coupling layer 740 formed above the fourth magnetic recording layer 738, and the fifth magnetic recording layer 744 (also referred to as the cap layer 744) formed above the fourth exchange coupling layer 740.

In some approaches, a total thickness, $t_{mrl}$, of the magnetic recording layer structure 724 may be in a range from about 12 nm to about 20 nm. In more approaches, the magnetic recording layer structure 724 has a thermal stability factor ($K_u V/k_B T$) of greater than or equal to about 80.

The four lowermost magnetic recording layers 726, 730, 734, 738 in the magnetic recording layer structure 724 may each include a plurality of grains separated from one another via a segregant material. In various approaches, the grains of one or more of the magnetic recording layers 726, 730, 734, 738 may include one or more of Co, Cr, Fe, Ta, Ni, Mo, Pt, W, Cr, Ru, Ti, Si, O, V, Nb, Ge, B, Pd. In more approaches, the segregant material of one or more of the magnetic recording layers 726, 730, 734, 738 may include 0 and/or at least one oxide of Ta, W, Nb, V, Mo, B, Si, Co, Cr, Ti, or Al. In one particular approach, one or more of the magnetic recording layers 726, 730, 734, 738 may include CoCrPtX+ oxide and/or O, where X may be B, Ta, Si, Ru, Ti, B, Cu, Ni, V, Mo, Mn, etc., and where the oxide may be $TiO_x$, $SiO_x$, $B_2O_3$, $W_2O_5$, $Ta_2O_5$, $NbO_2$, $CoO$, $Co_3O_4$, etc. A magnetic recording layer having grains separated by an oxide segregant may be referred to herein as an oxide magnetic recording layer.

In various approaches, the average center-to-center spacing (pitch) of the grains in the magnetic recording layer structure 724 may be less than or equal to about 8.3 nm. In further approaches, the average grain size in the magnetic recording layer structure 724 may be in a range from about 6 nm to about 8.5 nm.

In some approaches, a thickness of the first magnetic recording layer 726 may be greater than or equal to about 5 nm. In particular approaches, a thickness of the first magnetic recording layer 726 may be in a range from about 5 nm to about 8 nm, preferably in a range from about 6 nm to about 7 nm. In other approaches, a thickness of the first magnetic recording layer 726 may be greater than or about equal to 40% of the total thickness of the magnetic recording layer structure 724.

In more approaches, the thicknesses of the second, third and fourth magnetic recording layers 730, 734, 738 may each independently be in a range from 0.5 nm to about 3 nm. In some approaches, some or all of the second, third and fourth magnetic recording layers 730, 734, 738 may have thicknesses that are the same or different as one another. However, in preferred approaches, a thickness of one or more of the second, third, and fourth magnetic recording layers 730, 734, 738 may be about 1 nm.

In preferred approaches, the magnetic anisotropy energy, $K_u$, of the first magnetic recording layer 726 may be greater than or about equal to the $K_u$ of the second magnetic recording layer 730 and/or the $K_u$ of third magnetic recording layer 734. For instance, in one approach, the magnetic anisotropy field, $H_k$, of the first magnetic recording layer 726 may be greater than or equal to about 20 kOe. In more approaches, the $H_k$ of the second magnetic recording layer 730 and/or third magnetic recording layer 734 may be in a range from 15 kOe to 20 kOe.

In yet more approaches, the $K_u$ of the fourth magnetic recording layer 738 may also be greater than or about equal to the $K_u$ of the second magnetic recording layer 730 and/or the $K_u$ of the third magnetic recording layer 734. In still more approaches, the $K_u$ of the fourth magnetic recording layer 738 may be about equal to or less than the $K_u$ of the first magnetic recording layer 726. In particular approaches, the $H_k$ of the fourth magnetic recording layer 738 may be in a range from 15 kOe to 22 kOe.

As noted above, the second and third magnetic recording layers 730, 734 may each have a $K_u$ that is less than the $K_u$ values of the first and/or fourth magnetic recording layers 726, 738 in some approaches. Accordingly, in approaches where the first, second, third and fourth magnetic recording layers 726, 730, 734, 738 comprise $CoCrPt+O_2$ and/or oxide, the second and third magnetic layers 730, 734 may each comprise a higher percentage of at least one of Cr, $O_2$ and/or the oxide (e.g., $TiO_x$, $SiO_x$, $B_2O_3$, $W_2O_5$, $Ta_2O_5$, $NbO_2$, CoO, $Co_3O_4$, etc.), and other non-magnetic materials (e.g., Ta, Si, Ru, Ti, B, Cu, Ni, V, Mo, Mn, etc.,) to reduce their respective $K_u$ values compared to the $K_u$ values of the first and/or fourth magnetic recording layers 726, 738. Moreover, it is important to note that while the second and third magnetic recording layers 730, 734 may each have a $K_u$ that is less than the $K_u$ values of the first and/or fourth magnetic recording layers 726, 738 in some approaches, the $K_u$ values of the second and third magnetic recording layers 730, 734 may, but need not, be equal. For instance, the $K_u$ of the second magnetic recording layer 730 may be greater than, equal to, or less than the $K_u$ of the third magnetic recording layer 734 in further approaches.

A summary of some of the possible relationships between the $H_k$ values of the first magnetic recording layer 726 ($H_k1$), the second magnetic recording layer 730 ($H_k2$), the third magnetic recording layer 734 ($H_k3$) and the fourth magnetic recording layer 738 ($H_k4$) may be represented as follows:

$$H_k1 \geq H_k4 \geq H_k2 \geq H_k3;$$

$$H_k1 \geq H_k4 \geq H_k3 \geq H_k2.$$

As noted above, the magnetic recording layer structure 724 of FIG. 7A includes at least four exchange coupling layers 728, 732, 736, 740. The exchange coupling layers 728, 732, 736, 740 are configured to magnetically decouple the magnetic recording layers 726, 730, 734, 738, as well as promote the grain growth and crystalline orientation of the layers formed thereabove.

In various approaches, the exchange coupling layers 728, 732, 736, 740 are positioned in an upper portion 742 of the magnetic recording layer structure 724, wherein a thickness of the upper portion 742 may be less than or about equal to 60% of the total thickness, $t_{mrl}$, of the magnetic recording layer structure 724.

Each of the exchange coupling layers 728, 732, 736, 740 may include a plurality of grains separated from one another via a segregant material. In numerous approaches, the grains of one or more of the exchange coupling layers 728, 732, 736, 740 may include one or more of the same materials (e.g., Co, Cr, Fe, Ta, Ni, Mo, Pt, W, Cr, Ru, Ti, Si, O, V, Nb, Ge, B, Pd, etc.) included in the grains of one or more of the magnetic recording layers 726, 730, 734, 738. In additional approaches, the segregant material of one or more of the exchange coupling layers 728, 732, 736, 740 may include one or more of the same materials (e.g., $O_2$, at least one oxide of Ta, W, Nb, V, Mo, B, Si, Co, Cr, Ti, Al, etc.) included in the segregant material of one or more of the magnetic recording layers 726, 730, 734, 738. An exchange coupling layer having grains separated by an oxide segregant may be referred to herein as an oxide exchange coupling layer.

It is important to note that each of the exchange coupling layers 728, 732, 736, 740 are preferably nonmagnetic, e.g., have a saturation magnetization, $M_s$, less than or equal to about 100 emu/cc. Thus, one or more of the exchange coupling layers 728, 732, 736, 740 may include one or more of the same materials as one or more of the magnetic recording layers 726, 730, 734, 738, though not necessarily in the same stoichiometric proportions. For example, in some approaches, at least one of the exchange coupling layers and at least one of the magnetic recording layers may include CoCrPtX+O and/or oxide, where X may be Ta, Si, Ru, Ti, B, Cu, Ni, V, Mo, Mn, etc., and where the oxide may include one or more of $TiO_x$, $SiO_x$, $B_2O_3$, $W_2O_5$, $Ta_2O_5$, $NbO_2$, CoO, $Co_3O_4$, etc.; however, the amount of Co in the exchange coupling layer may be less than the amount of Co in the magnetic recording layer. Further, an amount of Co in the first magnetic recording layer 726 is greater than or about equal to the Co amount in the second, third and fourth magnetic recording layers 730, 734, and 738.

In various approaches, the thicknesses of the exchange coupling layers 728, 732, 736, 740 may each independently be in a range from about 0.5 nm to about 2 nm. In some approaches, some or all of the exchange coupling layers 728, 732, 736, 740 may have thicknesses that are the same or different as one another. For instance, in particular approaches, the thickness of the second exchange coupling layer 732 may be less than, equal to, or greater than the thickness of third exchange coupling layer 736.

In more approaches, the thickness of the second exchange coupling layer 732 may be greater than the thickness of the first exchange coupling layer 728 and/or the thickness of the fourth exchange coupling layer 740. In yet more approaches, the thickness of the third exchange coupling layer 736 may be greater than the thickness of the first exchange coupling layer 728 and/or the thickness of the fourth exchange coupling layer 740. In still more approaches, the thickness of the first exchange coupling layer 728 may be less than the thicknesses of all other exchange coupling layers. In still more approaches, the thickness of the first exchange coupling layer 728 may be about equal to the thickness of the fourth exchange coupling layer 740. In one preferred approach, the thickness of the first exchange coupling layer 728 may be about 0.6 nm; the thickness second exchange coupling layer 732 may be about 1 nm; the thickness of the third exchange coupling layer 736 may be about 1 nm; and the thickness of the fourth exchange coupling layer 740 may be about 0.7 nm.

In further approaches, grains in the magnetic recording layers 726, 730, 734, 738 and the exchange coupling layers 728, 732, 736, 740 may have a columnar shape. Moreover, the grains in each of the magnetic recording layers 726, 730, 734, 738 and the exchange coupling layers 728, 732, 736, 740 may be physically characterized by growth directly on the grains present in the layers thereabove and/or therebelow. For instance, each of the grains in the fourth exchange coupling layer 740 may be formed directly on the grains in the fourth magnetic recording layer 738, which in turn may be formed directly on the grains in the third exchange coupling layer 736 and so on.

It is important to note that while the magnetic recording layer structure 724 of FIG. 7A includes five magnetic recording layers 726, 730, 734, 738, 744 and four exchange coupling layers 728, 732, 736, 740, the magnetic recording layer structure 724 may include one or more additional magnetic recording layers and one or more additional exchange coupling layers in various approaches. For instance, as shown in FIG. 7B, a perpendicular magnetic recording medium 701 may include a magnetic recording layer structure 748 having six or more magnetic recording layers and five or more exchange coupling layers, where the magnetic recording layers and the exchange coupling layers are arranged in an alternating pattern. As FIG. 7B depicts one exemplary variation of the perpendicular magnetic recording medium 700 of FIG. 7A, components and layers of FIG. 7B have common numbering with those of FIG. 7A. It is important to note, however, that the fifth magnetic recording layer 744 shown in FIG. 7A, is represented as the sixth magnetic recording layer 744 in FIG. 7B.

With continued reference to FIG. 7A, the fifth magnetic recording layer 744 (also referred to as the cap layer 744) may form the uppermost layer in the magnetic recording layer structure 724. Suitable materials for the fifth magnetic recording layer (cap layer) 744 may include, but are not limited to, a Co-, CoCr-, CoPtCr-, and/or CoPtCrB-based alloy, or other such material as would become apparent to one having skill in the art upon reading the present disclosure. In various approaches, the fifth magnetic recording layer (cap layer) 744 may be a continuous cap layer that does not include a segregant material. For instance, in one approach, the fifth magnetic recording layer (cap layer) 744 may not include any oxides. In some approaches, the fifth magnetic recording layer (cap layer) 744 may be doped with a small amount of oxygen. For example, in particular approaches, the fifth magnetic recording layer (cap layer) 744 may be a continuous, partially oxidized cap layer formed at a lower argon pressure than all other magnetic recording layers positioned therebelow, thus forming a cap layer that is continuous, or at least more continuous than all other magnetic recording layers in the magnetic recording layer structure 724.

In more approaches, a thickness of the fifth magnetic recording layer (cap layer) 744 may be in a range from about 2 nm to about 5 nm. In preferred approaches the thickness of the fifth magnetic recording layer (cap layer) 744 may be about 3 nm. In yet more approaches, the fifth magnetic recording layer (cap layer) 744 may comprise multiple layers configured to achieve ideal separation, magnetics and smoothness.

In additional approaches, the magnetic anisotropy energy, $K_u$, of the fifth magnetic recording layer (cap layer) 744 may be less than or about equal to the $K_u$ of the first and/or fourth magnetic recording layers 726, 736. Moreover, while the second, third, and fifth magnetic recording layers 730, 734, 744 may each have a $K_u$ that is less than the $K_u$ values of the first and/or fourth magnetic recording layers 726, 738 in some approaches, the $K_u$ values of the second, third and fifth magnetic recording layers 730, 734, 744 may, but need not, be equal. For instance, the $K_u$ of the fifth magnetic recording layer 730 may be greater than, equal to, or less than the $K_u$ of the second and/or third magnetic recording layers 730, 734 in further approaches. In particular approaches, the $H_k$ of the fifth magnetic recording layer (cap layer) 744 may be in a range from 10 kOe to 18 kOe.

As shown in FIG. 7A, a protective overcoat layer 746 is formed above the fifth magnetic recording layer (cap layer) 744. The protective overcoat layer 746 may be configured to protect the underlying layers from wear, corrosion, etc. This protective overcoat layer may be made of, for example, diamond-like carbon, carbon nitride, Si-nitride, BN or R4C, etc. or other such materials suitable for a protective overcoat as would become apparent to one having skill in the art upon reading the present disclosure.

In additional approaches, an optional lubricant layer (not shown in FIG. 7A) may be formed above the protective overcoat layer 746. The material of the lubricant layer may include, but is not limited to perfluoropolyether, fluorinated alcohol, fluorinated carboxylic acids, etc., or other suitable lubricant material as known in the art.

As is described in greater detail below, it has been surprisingly and unexpectedly found that the perpendicular magnetic recording medium 700 having at least five magnetic recording layers 726, 730, 734, 738, 744 and at least four exchange coupling layers 728, 732, 736, 740 exhibits improved magnetic recording characteristics (e.g., signal-to-noise ratio (SNR), overwrite (OW), magnetic core width (MCW), etc.) as compared to a perpendicular magnetic recording medium having four or less magnetic recording layers and three or less exchange coupling layers (e.g., as shown in FIG. 6). The improvement in the magnetic recording characteristics, such as the OW, for the perpendicular magnetic recording medium 700 of FIG. 7 is indeed surprising and unexpected given the increase in overall thickness of the magnetic recording layer structure 724 (e.g., via addition of at least one additional magnetic recording layer and at least one addition exchange coupling layer, and incorporation of a thicker, high $K_u$ lowermost magnetic recording layer) relative to the magnetic recording layer structure 624 of the perpendicular magnetic recording medium 600 shown in FIG. 6. Rather, one skilled in the art would typically expect that increasing the thickness of the lowermost, high Ku magnetic recording layer, and/or adding at least one more magnetic recording layer and at least one more exchange coupling layer, both of which ultimately increase the distance between the magnetic head and the lowermost magnetic recording layer, would actually degrade media writeability.

EXPERIMENTAL DATA AND COMPARATIVE EXAMPLES

The following experimental data describe features and/or characteristics associated with the novel perpendicular magnetic storage media disclosed herein, particularly those having a magnetic recording layer structure comprising five magnetic recording layers and four exchange coupling layers as shown FIG. 7A. A perpendicular magnetic recording medium having a magnetic recording layer structure with five magnetic recording layers and four exchange coupling layers may be referred to as a "quad ECL structure" or "Q-ECL" for clarity.

Comparative examples are also provided to illustrate the differences between quad ECL structures and triple ECL (T-ECL) structures (i.e., perpendicular magnetic recording media having a magnetic recording structure with four magnetic recording layers and three exchange coupling layers as shown FIG. 6).

Also for clarity, the lowermost magnetic recording layer in a quad ECL structure (e.g., the first magnetic recording layer 726 shown in FIG. 7A) may be referred to as the "G0" layer, whereas the lowermost magnetic recording layer in a triple ECL structure (e.g., the first magnetic recording layer 626 shown in FIG. 6) may be referred to as the "G1" layer. Additionally, the media grain pitch in a quad or triple ECL structure corresponds to the average grain pitch in the magnetic recording layer structure present therein (e.g., the magnetic recording layer structure 724 shown in FIG. 7A for the quad ECL structure; and the magnetic recording layer structure 624 shown in FIG. 6 for the triple ECL structure).

It is important to note that the experimental data and comparative examples do not limit the invention in anyway.

Figure 12:
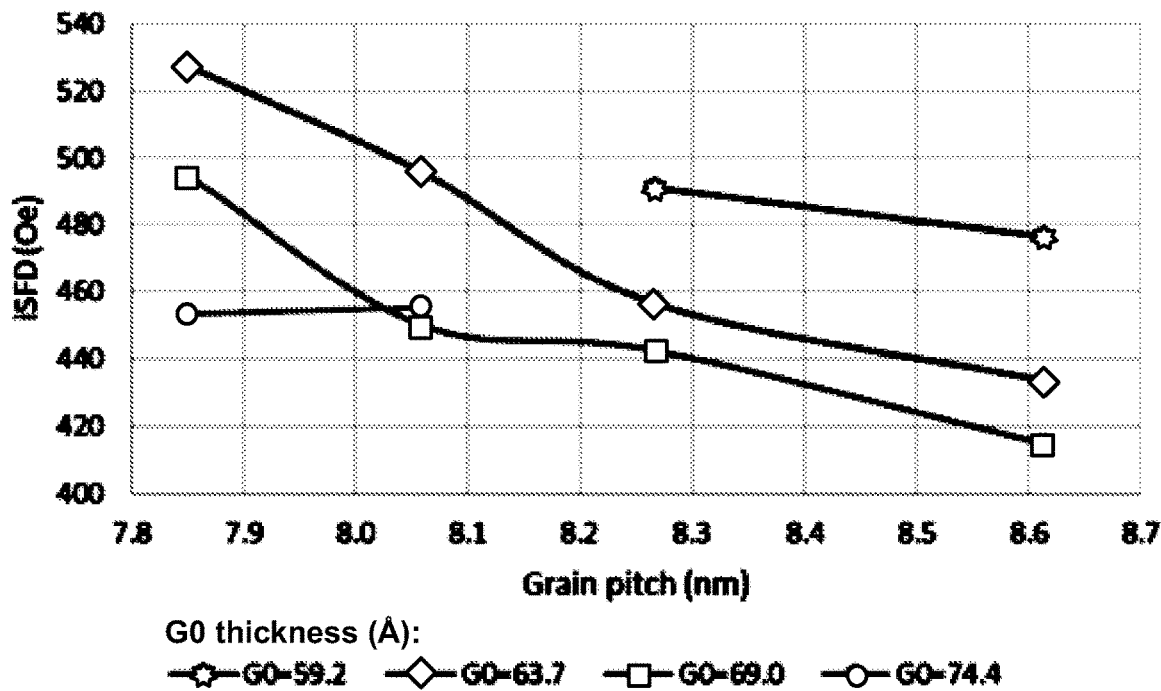
FIG. 12 is a plot of the intrinsic switching field distribution (iSFD) versus media grain pitch for various quad ECL structures having different G0 thicknesses.

FIGS. 8-12 provide plots illustrating the relationship between various measured magnetic characteristics and media grain pitch for four quad ECL structures with different G0 thicknesses. These measure magnetic characteristics include: the coercivity, $H_c$, (FIG. 8); the nucleation field, $H_n$, (FIG. 9); the switching field distribution, SFD (FIG. 10); the thermal stability factor, $K_uV/k_BT$, (FIG. 11); and the intrinsic switching field distribution, iSFD, (FIG. 12). As discussed previously, to achieve an areal recording density of at least 1 Tbit/in$^2$, a grain pitch of about 8 nm or less is needed. However, decreasing grain pitch may also result in degrading the aforementioned magnetic characteristics, e.g., $H_c$ decreases, $H_n$ increases, SFD increases, $K_uV/k_BT$ decreases, and iSFD increases. Despite the negative effects associated with decreasing grain pitch, increasing the thickness of the G0 layer to be in a range from about 6 nm to about 7.4 nm when the grain pitch is about 8 nm or less nonetheless yields desired values for $H_c$, $H_n$, SFD, $K_uV/k_BT$, and iSFD, as shown in FIGS. 8-12.

Figure 13:
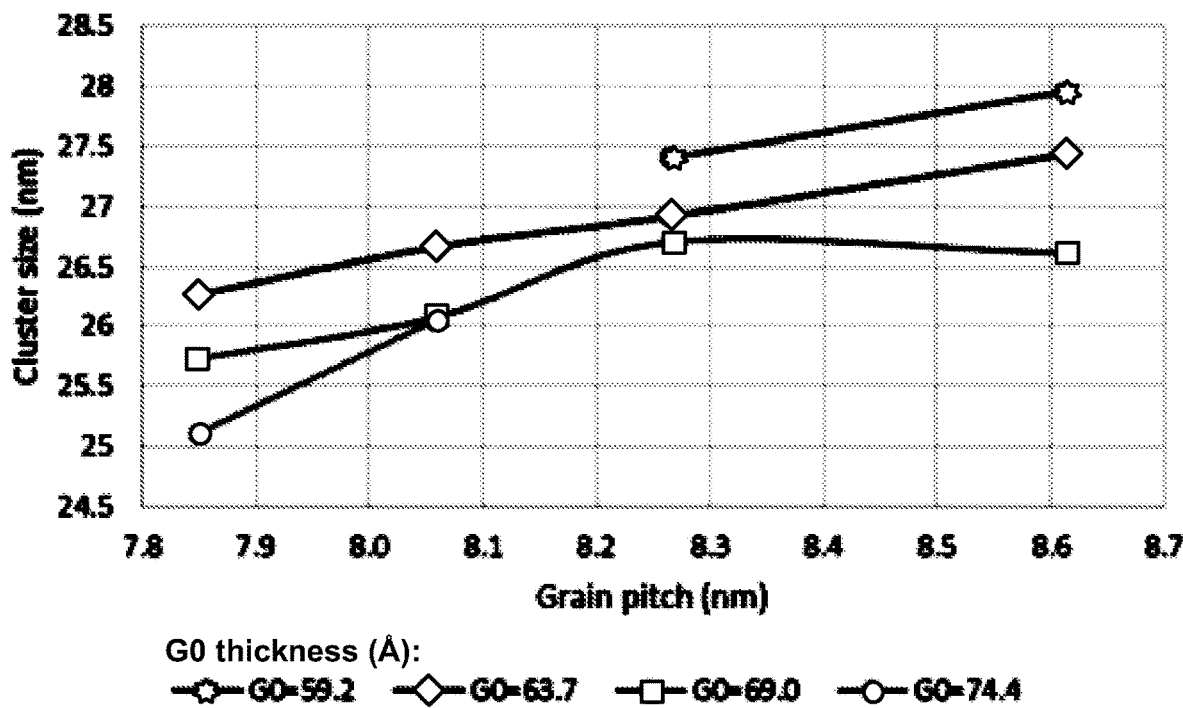
FIG. 13 is a plot of the magnetic cluster size versus media grain pitch for various quad ECL structures having different G0 thicknesses.

FIG. 13 provides a plot illustrating the relationship between magnetic cluster size and media grain pitch for four quad ECL structures with different G0 thicknesses. One having skill in the art would not necessarily expect the magnetic cluster size, corresponding to the reversal unit of magnetization in the granular magnetic recording layer, to continually decrease with decreasing grain size and pitch. For instance, a plot of magnetic cluster size versus grain pitch for a triple ECL structure typically exhibits a "cluster size knee" characteristic of a cluster size that initially decreases with grain pitch until a particular grain pitch is reached, after which the cluster size increases as the grain pitch continues to decrease. However, it has been surprisingly and unexpectedly found that for quad ECL structures having a G0 layer with a thickness in a range from about 6 nm to about 7.4 nm, the magnetic cluster size continually decreases with decreasing grain pitch and thus does not exhibit a cluster size knee.

Figure 14:
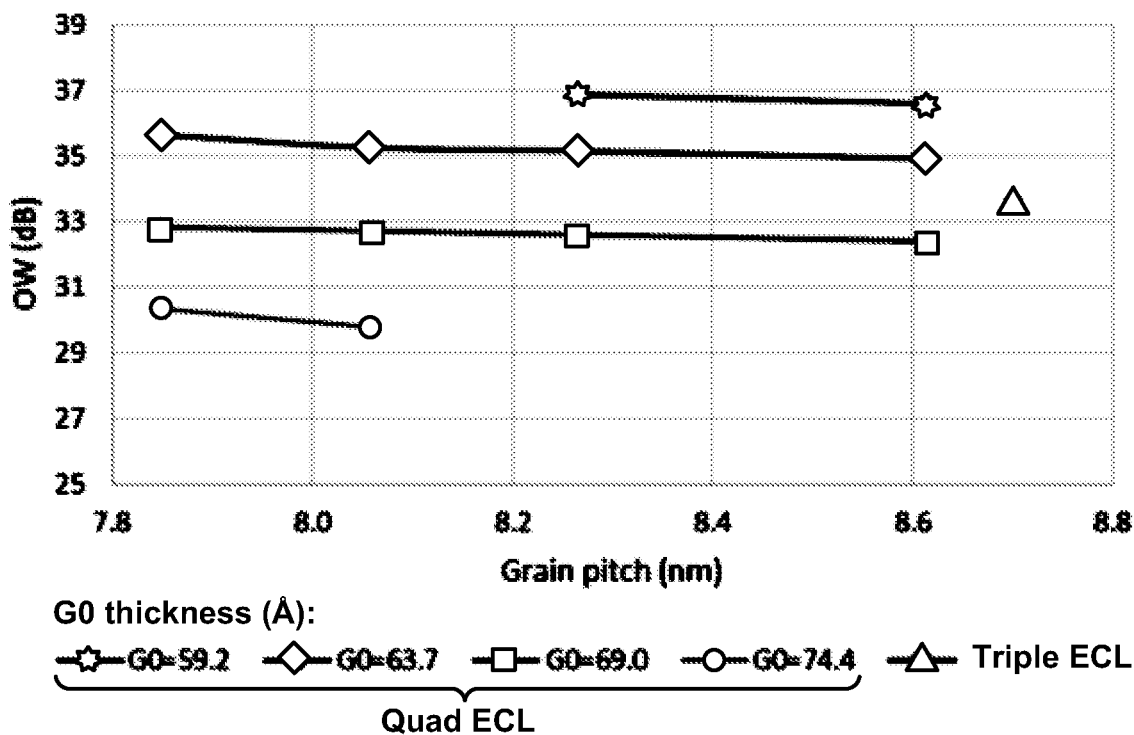
FIG. 14 is a plot of the overwrite (OW) versus media grain pitch for a triple ECL structure and various quad ECL structures with different G0 thicknesses.

FIG. 14 shows a plot illustrating the relationship between overwrite (OW) and media grain pitch for four quad ECL structures with different G0 thicknesses and a triple ECL structure. As shown in FIG. 14, the OW does not significantly vary with grain size and pitch; however, the OW does strongly depend on G0 thickness. Moreover, FIG. 14 highlights the surprising and unexpected results that quad ECL structures having a G0 layer with a thickness in a range from about 6 nm to about 7.4 nm exhibit comparable or superior OW results compared to the triple ECL structure having a G1 layer with a thickness of about 5 nm.

Figure 15:
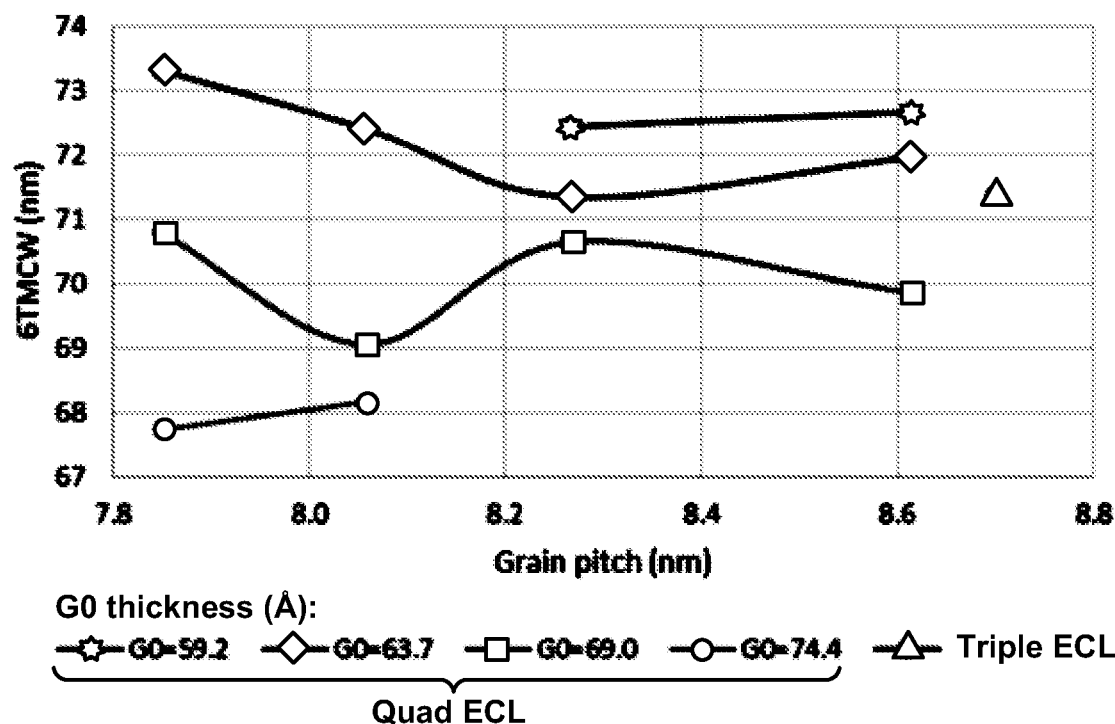
FIG. 15 is a plot of magnetic core width (MCW) versus media grain pitch for a triple ECL structure and various quad ECL structures with different G0 thicknesses.

FIG. 15 shows a plot illustrating the relationship between magnetic core width (MCW) and media grain pitch for four quad ECL structures with different G0 thicknesses and a triple ECL structure. In particular, FIG. 15 provides a plot of the 6TMCW versus grain pitch. Frequency T (or 1 T) is the highest linear frequency for a particular PMR medium. For example, if 1 T=1460 kfci, 2 T indicates that the frequency is half of the 1 T frequency (i.e., 2 T=730 kfci), and 6 T would be ⅙ of the 1 T frequency (e.g., 6 T=about 243 kfci). Accordingly, 6TMCW is the magnetic core width at frequency T/6.

As shown in FIG. 15, while the 6TMCW does not significantly vary with grain size, it does strongly depend on G0 thickness. FIG. 15 further highlights that quad ECL structures having a G0 layer with a thickness in a range from about 6 nm to about 7.4 nm exhibit a comparable or superior 6TMCW compared to the triple ECL structure having a G1 layer with a thickness of about 5 nm.

Figure 16:
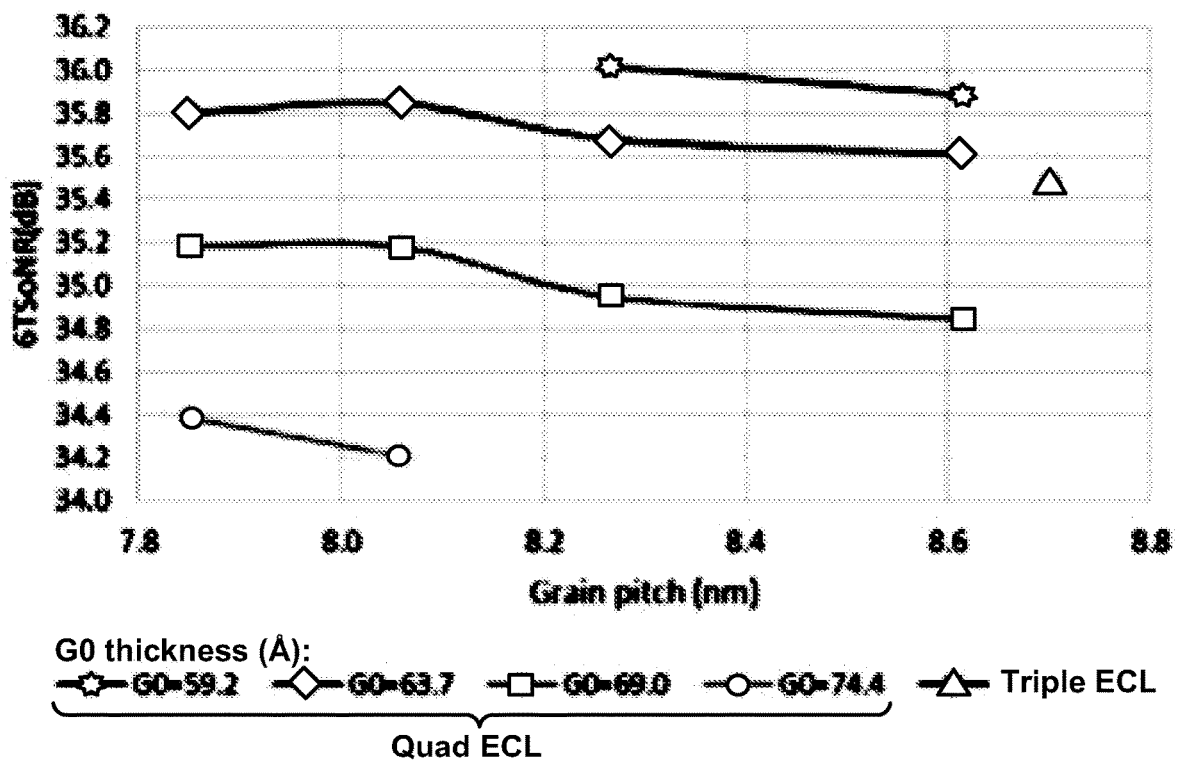
FIG. 16 is a plot of 6TSoNR versus media grain pitch for a triple ECL structure and various quad ECL structures with different G0 thicknesses.
Figure 17:
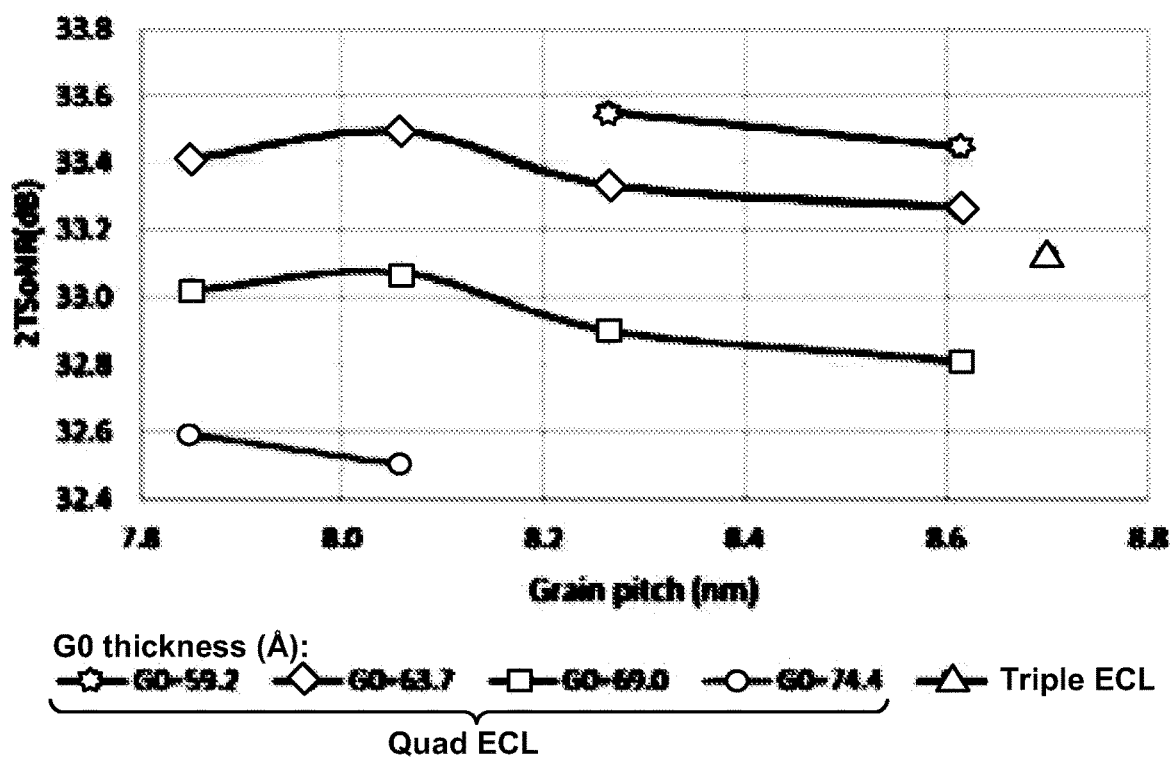
FIG. 17 is a plot of 2TSoNR versus media grain pitch for a triple ECL structure and various quad ECL structures with different G0 thicknesses.
Figure 18:
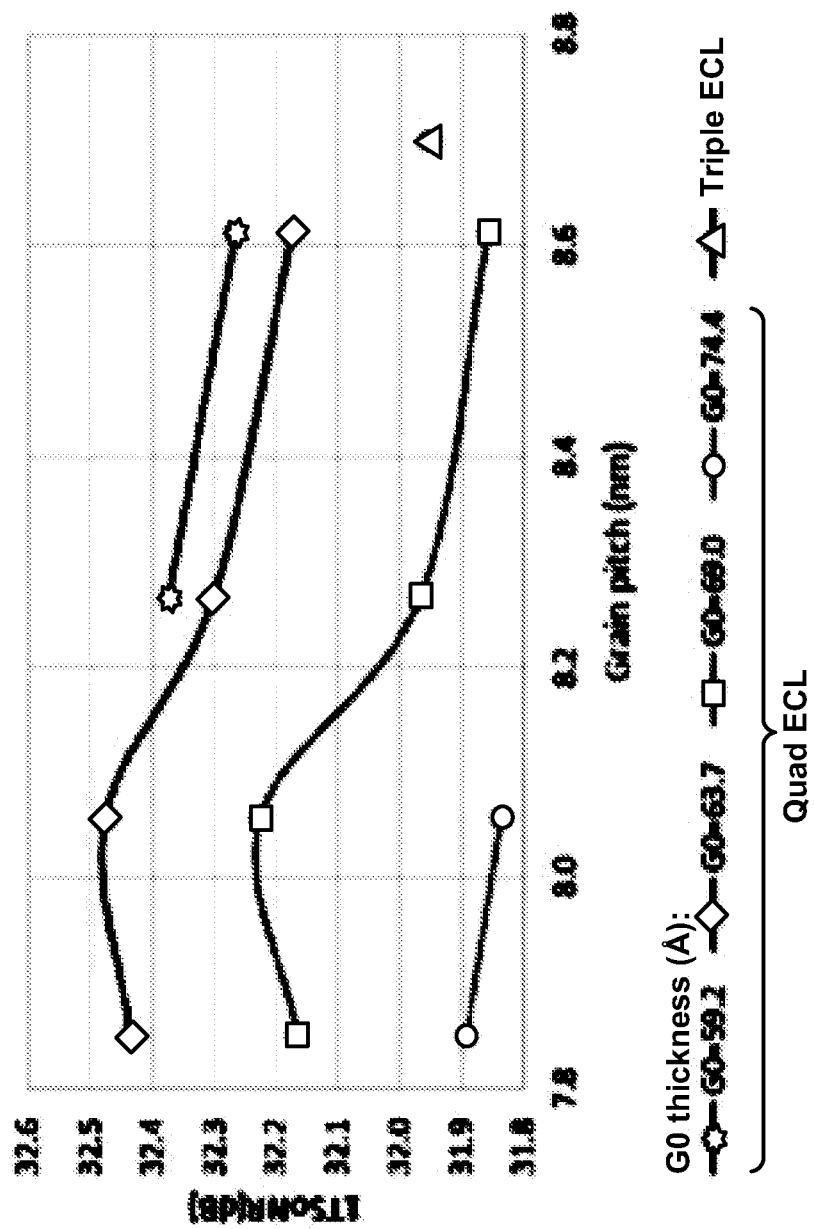
FIG. 18 is a plot of 1TSoNR versus media grain pitch for a triple ECL structure and various quad ECL structures with different G0 thicknesses.

FIGS. 16-18 show several plots illustrating the relationship between SoNR and media grain pitch for four quad ECL structures with different G0 thicknesses and a triple ECL structure. In particular, FIG. 16 provides a plot of 6TSoNR versus grain pitch; FIG. 17 provides a plot of 2TSoNR versus grain pitch; and FIG. 18 provides a plot of 1TSoNR versus grain pitch. SoNR refers to the spectral signal-to-noise ratio at a fixed signal measured at a fixed linear density. Stated another way, SoNR refers to the low frequency signal (So) [measured at about 100 kfci (kiloflux changes per inch)] over the integrated noise power at a frequency of T. As noted above, frequency T (or 1 T) is the highest linear frequency for a particular PMR medium. Accordingly, 1TSNR is the spectral signal-to-noise ratio of the signal (S) (at a frequency T) over the integrated noise power at a frequency of T; 2TSNR is the spectral signal-to-noise ratio of the signal (S) (at a frequency T/2) over the integrated noise power at a frequency of T/2; and 6TSNR is the spectral signal-to-noise ratio of the signal (S) (at a frequency T/6) over the integrated noise power at a frequency of T/6.

SoNR measurements differ from SNR measurements only in that the signal used for the SoNR corresponds to the low frequency signal, So. SoNR measurements provide a better sense of how the noise alone increases with increasing frequency, whereas SNR measurements combines the signal rolloff (signal decreases with increasing frequency) and the integrated noise increase with increasing linear frequency.

As shown in FIGS. 16-17, there is no significant variation in the 6TSoNR and 2TSoNR for different grain pitch values; however, a dependence between the G0 thickness and the 6TSoNR, 2TSoNR is evident. In particular, FIGS. 16-17 highlight that quad ECL structures having a G0 layer with a thickness preferably in a range from about 6 nm to about 7 nm exhibit a comparable or superior 6TSoNR and 2TSoNR compared to the triple ECL structure having a G1 layer with a thickness of about 5 nm.

FIG. 18 illustrates that the SoNR at the highest linear density (1TSoNR) does vary with grain pitch to a greater extent than the 6 T SoNR and 2 T SoNR. Similar to FIGS. 16-17, FIG. 18 also illustrates a dependence between G0 thickness and 1TSoNR, where quad ECL structures having a G0 layer with a thickness preferably in a range from about 6 nm to about 7 nm exhibit a comparable or superior 1TSoNR compared to the triple ECL structure having a G1 layer with a thickness of about 5 nm.

Figure 19:
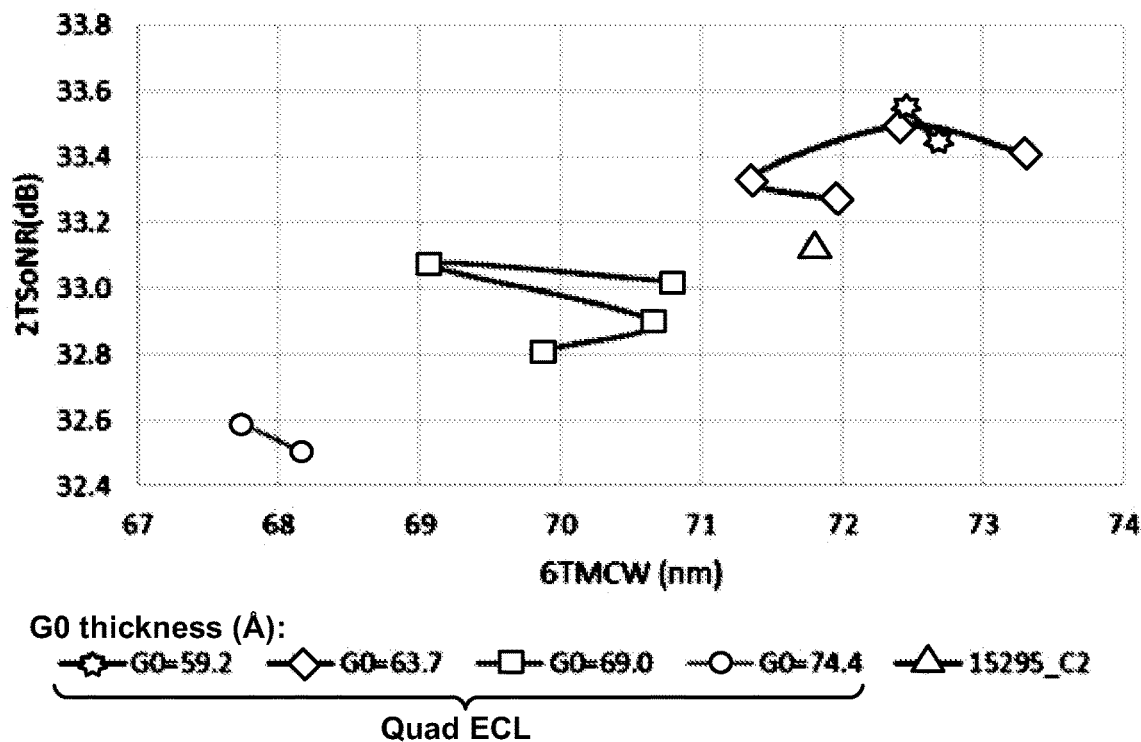
FIG. 19 is a plot of 2TSoNR versus 6TMCW for a triple ECL structure and various quad ECL structures with different G0 thicknesses.
Figure 20:
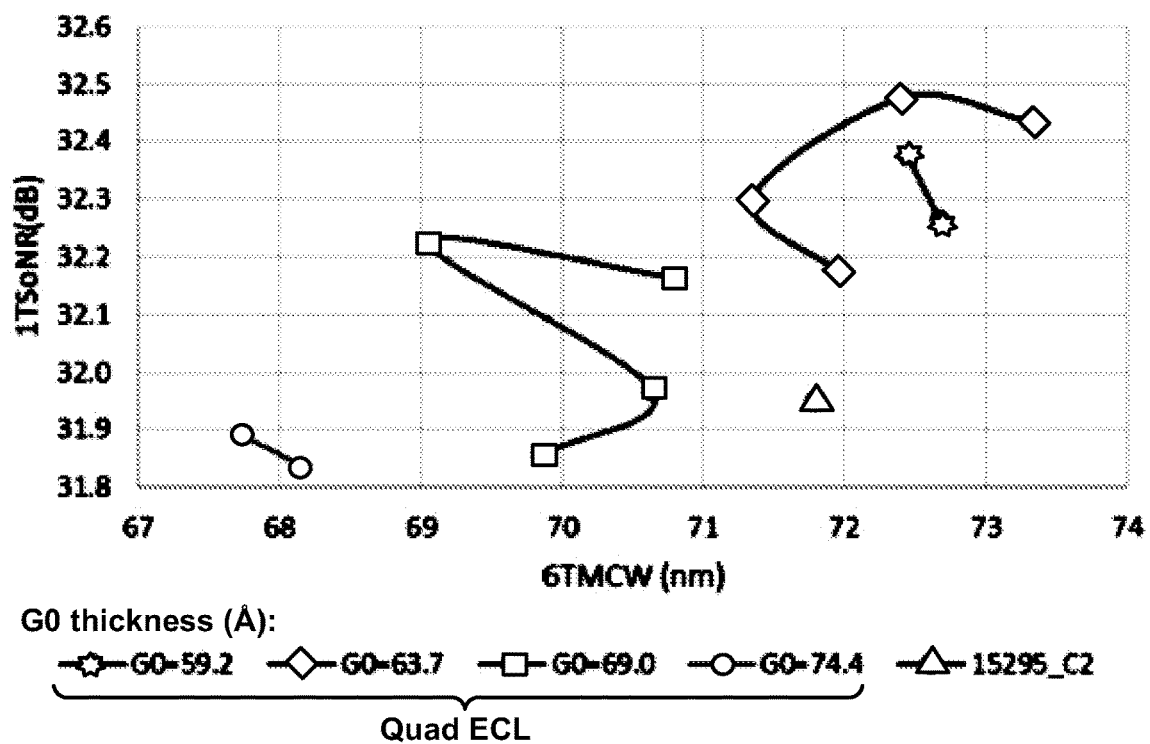
FIG. 20 is a plot of 1TSoNR versus 6TMCW for a triple ECL structure and various quad ECL structures with different G0 thicknesses.

FIGS. 19-20 show several plots illustrating the relationship between SoNR and MCW for four quad ECL structures with different G0 thicknesses and a triple ECL structure. In particular, FIG. 19 provides a plot of 2TSoNR versus 6TMCW, and FIG. 20 provides a plot of 1TSoNR versus 6TMCW. FIGS. 19 and 20 highlight the dependence between MCW and G0 thickness, as well as the comparable and superior 1TSoNR and 2TSoNR values for quad ECL structures having a G0 layer with a thickness preferably in a range from about 6 nm to about 7 nm as compared to the triple ECL structure having a G1 layer with a thickness of about 5 nm.

Figure 21:
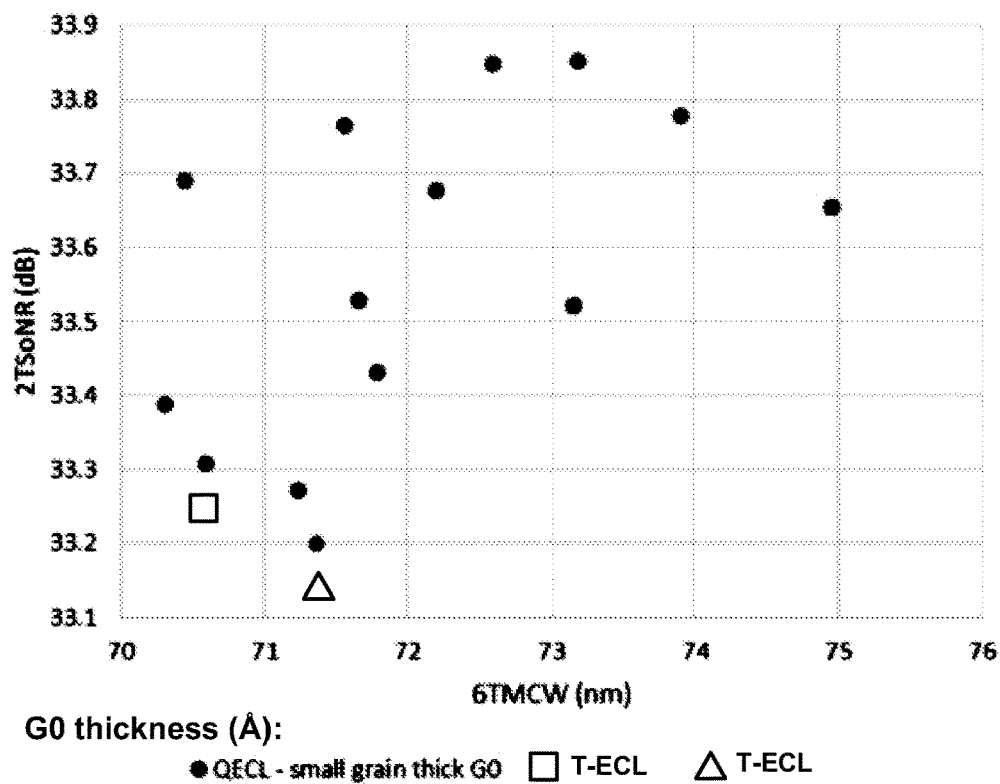
FIG. 21 is a plot of 2TSoNR versus 6TMCW for two triple ECL structures and quad ECL structure.
Figure 22:
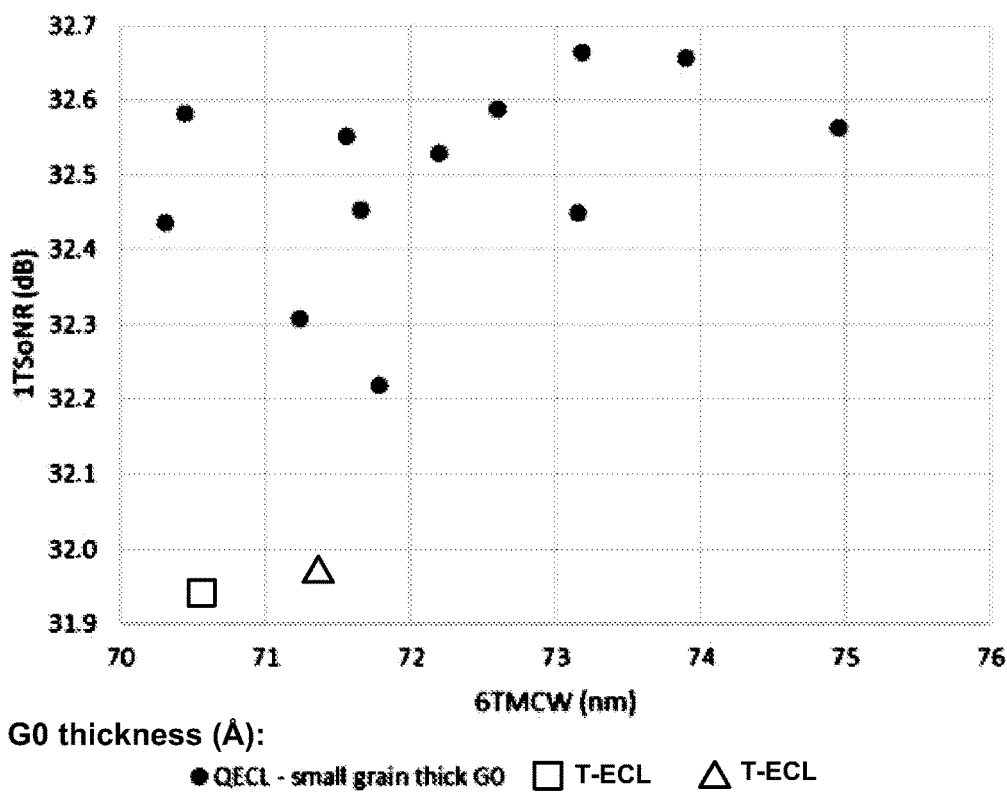
FIG. 22 is a plot of 1TSoNR versus 6TMCW for two triple ECL structures and quad ECL structure.

FIGS. 21-22 show several plots illustrating the relationship between SoNR and MCW for a quad ECL structure compared to two triple ECL structures. Specifically, FIG. 21 provides a plot of 2TSoNR versus 6TMCW, and FIG. 22 provides a plot of 1TSoNR versus 6TMCW. Moreover, for FIGS. 21-22, the quad ECL structure (corresponding to the circular indicators) has a media grain pitch of 8.1 nm and a 6.3 nm thick G0 layer; the triple ECL structure (corresponding to the square indicator) has a media grain pitch of 8.7 nm and a 5.3 nm thick G1 layer; and the triple ECL structure (corresponding to the triangular indicator) has a media grain pitch of 8.8 nm and a 5.1 nm thick G1.

Figure 23:
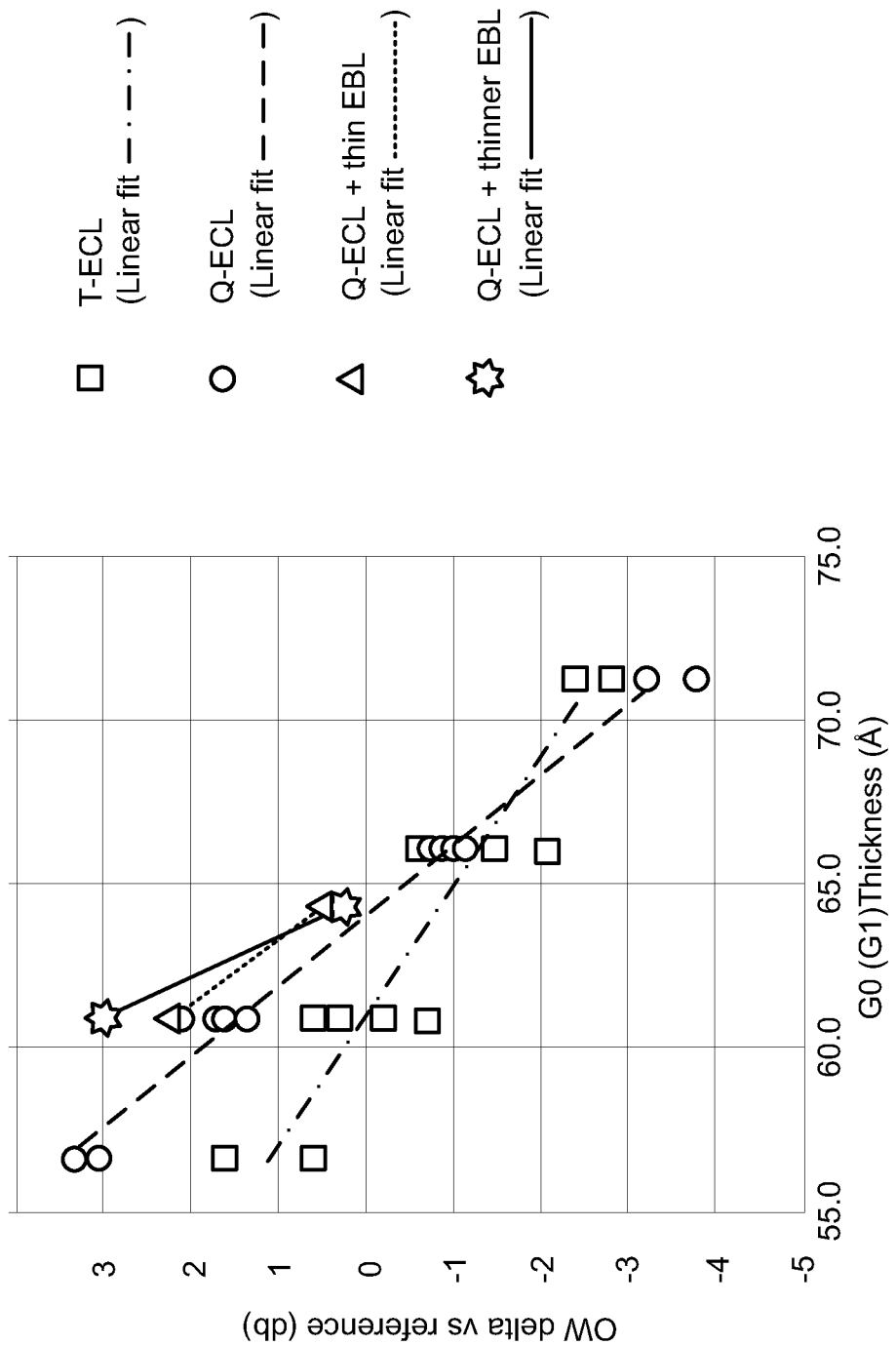
FIG. 23 is a plot of OW versus G0 thickness for a triple ECL structure and various quad ECL structures having different exchange break layer (EBL) structure thicknesses.

FIG. 23 shows a plot illustrating the relationship between OW and G0 thickness for three quad ECL structures with different EBL structure thicknesses and a triple ECL structure. The EBL structure thicknesses for each ECL structure shown in FIG. 23 is as follows:

Triple ECL structure (square indicators): 17 nm
Quad ECL structure (circular indicators): 17 nm
Quad ECL structure+EBL (triangular indicators): 15 nm
Quad ECL structure+thinner EBL (star indicators): 13 nm.

As shown in FIG. 23, each of the quad ECL structures having G0 thicknesses up to about 6.5 nm exhibit superior results in writeability as compared to the triple ECL structure. However, it is of note that the writeability advantage for the quad ECL structure corresponding to the circular indicators may begin to decrease for G0 thicknesses greater than about 6.5 nm due to the greater overall thickness of the quad ECL structure. Accordingly, as also shown in FIG. 23, reducing the thickness of the EBL structure in the quad ECL structures further improves writeability.

Figure 24:
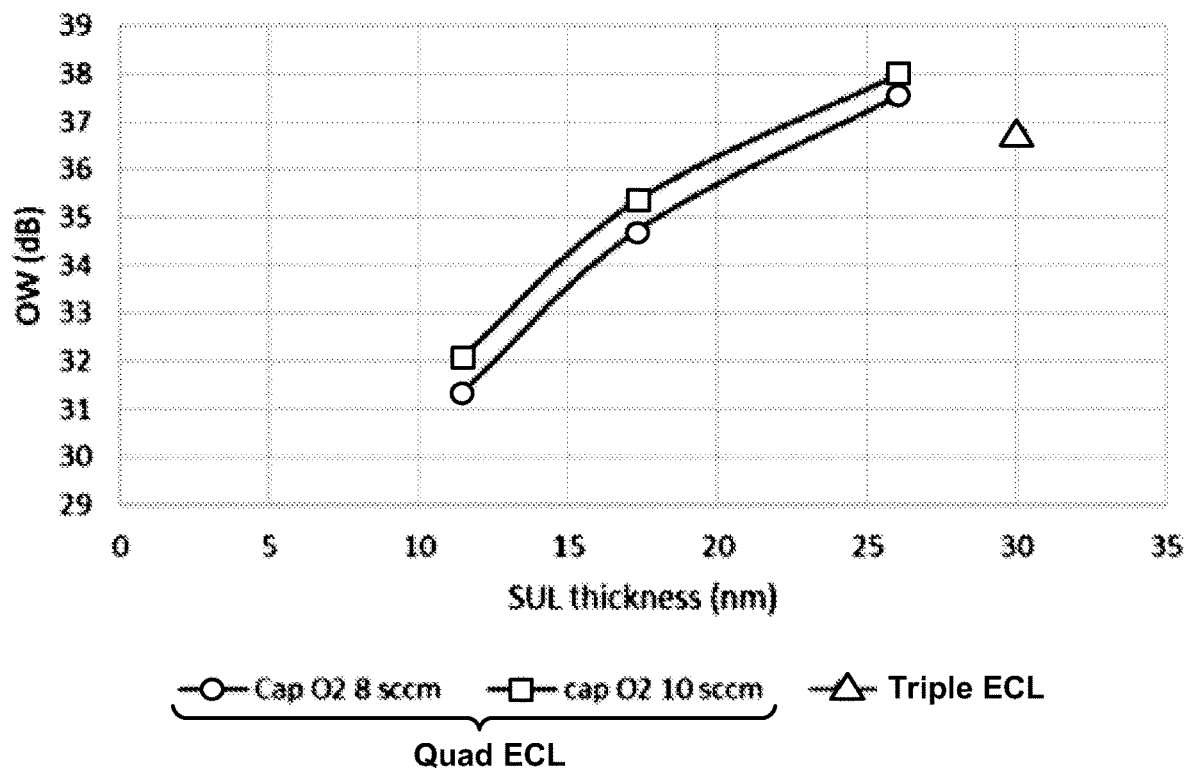
FIG. 24 is a plot of OW versus overall thickness of the soft magnetic underlay (SUL) structure for two quad ECL structures and a triple ECL structure.
Figure 25:
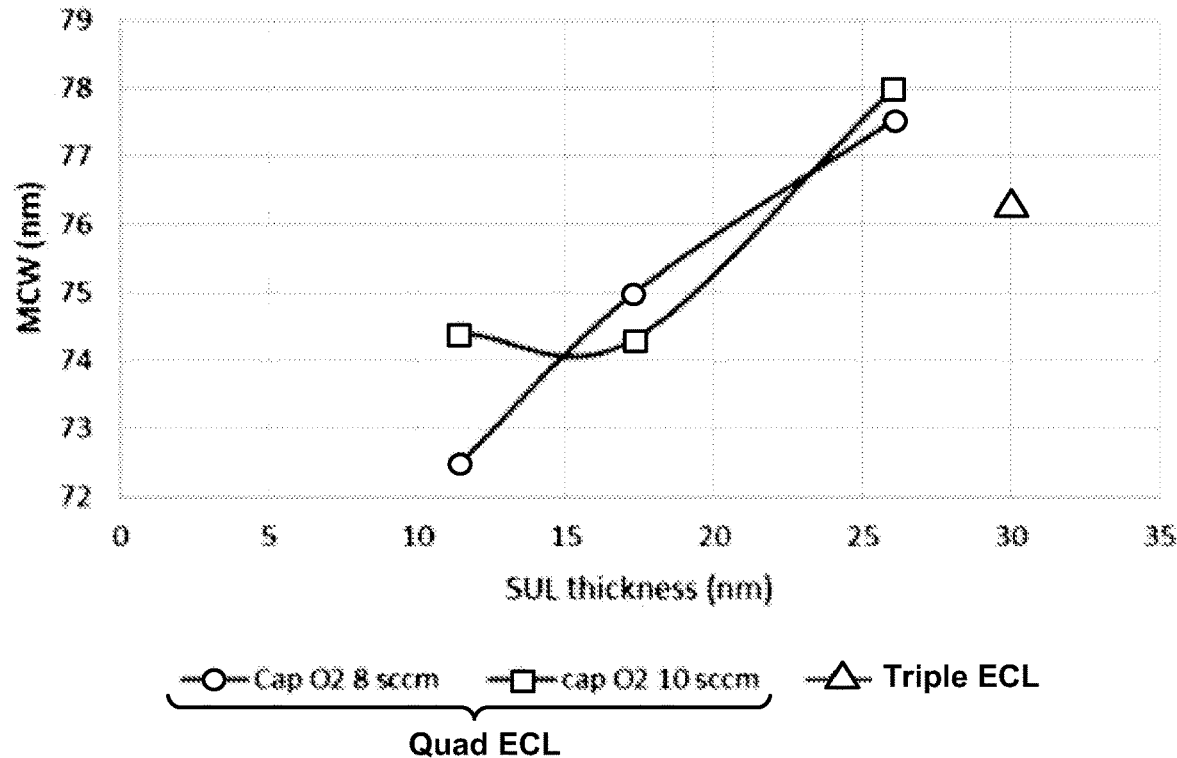
FIG. 25 is a plot of MCW versus overall thickness of the soft magnetic underlay (SUL) structure for two quad ECL structures and a triple ECL structure.
Figure 26:
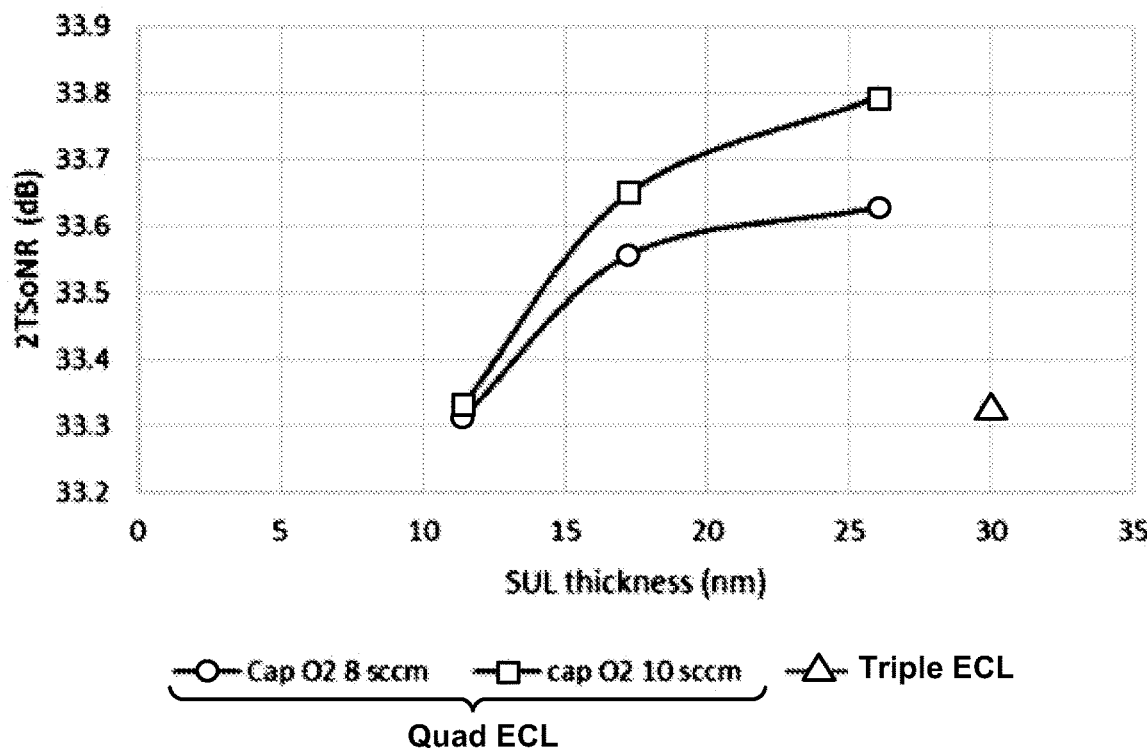
FIG. 26 is a plot of 2TSoNR versus overall thickness of the soft magnetic underlay (SUL) structure for two quad ECL structures and a triple ECL structure.
Figure 27:
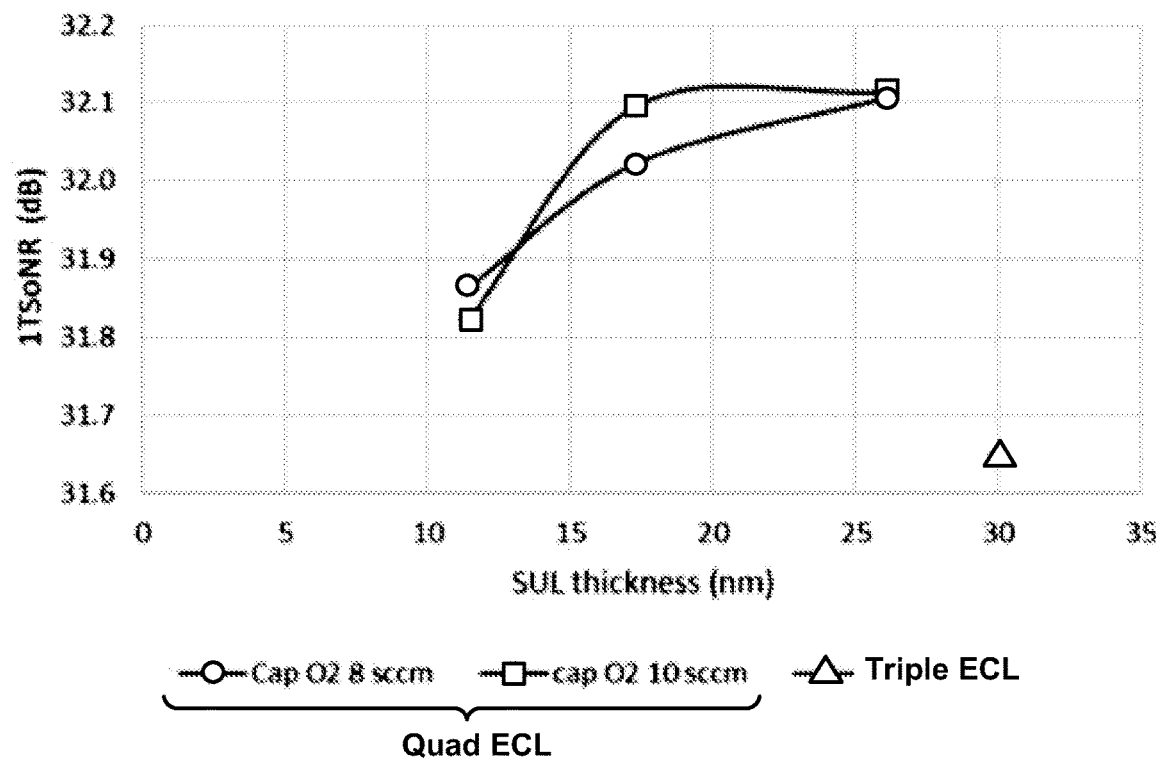
FIG. 27 is a plot of 1TSoNR versus overall thickness of the soft magnetic underlay (SUL) structure for two quad ECL structures and a triple ECL structure.

FIGS. 24-27 show plots illustrating the relationship between various measured magnetic characteristics and overall thickness of the SUL structure for two quad ECL structures and a triple ECL structure. These measure magnetic characteristics include: OW (FIG. 24); MCW (FIG. 25); 2TSoNR (FIG. 26); and 1TSoNR (FIG. 27). The two quad ECL structures shown in FIGS. 24-27 have a G0 thickness of about 6.3 nm, whereas the triple ECL structure has a G1 thickness of about 5.3 nm. Additionally, the two quad ECL structures have different cap layer compositions that differ primarily with regard to the amount of $O_2$ flowing during the sputtering deposition. Particularly, the quad ECL structure represented by the square indicators in FIGS. 24-27 has a cap layer with a higher moment than the quad ECL structure represented by the circular indicators.

Review of FIGS. 24-27 reveals that the quad ECL structures having a SUL structure with a thickness in a range from about 12 nm to about 25 nm exhibit comparable or superior OW results compared to the triple ECL that has a 30 nm thick SUL structure. Moreover, the quad ECL structures having a SUL structure with a thickness in a range from about 12 nm to about 25 nm exhibit a comparable or narrower MCW while still maintaining good SoNR.

Referring now to Table 1 below, several measurements of recording characteristics are shown for a triple ECL structure and three quad ECL structures. Each of the quad ECL structures (A-C) have a 6.3 nm thick G0 layer; whereas the triple ECL structure has a 5.3 nm thick G1 layer. Moreover, the primary difference between the three quad ECL structures (A-C) corresponds to the degree of lateral exchange coupling in the cap layer, with quad ECL B having a cap layer with a greater degree of lateral exchange coupling than quad ECL A, and quad ECL C having the greatest degree of lateral exchange coupling as compared to quad ECL A and quad ECL B.

It is evident from Table 1, that the quad ECL structures exhibit comparable or superior recording characteristics as compared to the triple ECL structure. For example, a comparison between the quad ECL structure A and the triple ECL structure reveals that the quad ECL structure A exhibits about 0.1 order N-SER gain, about the same OW, a narrower MCW and greater than about 1% ADC_FOM gain.

TABLE 1

Recording Parametric Measurements

| | Triple ECL | Quad ECL A | Quad ECL B | Quad ECL C |
|---|---|---|---|---|
| 6TMCW (nm) | 66.3 | 64.8 | 67.1 | 66.8 |
| N-SER (nm) | −5.03 | −5.18 | −5.00 | −5.12 |
| ADC_FOM | 668.6 | 679.0 | 679.1 | 675.4 |
| EB (nm) | 3.07 | 3.40 | 3.22 | 3.20 |
| N-OW (nm) | 30.9 | 30.8 | 33.3 | 33.1 |
| 2T SoNR | 32.0 | 32.0 | 32.4 | 32.5 |
| T50 | 19.46 | 20.06 | 20.04 | 19.53 |

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

It should also be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium comprising:
   a recording layer structure comprising:
   a plurality of magnetic recording layers; and
   a plurality of nonmagnetic exchange coupling layers alternating with the plurality of magnetic recording layers;
   wherein:
      each of the plurality of nonmagnetic exchange coupling layers comprises a CoCrPtX-oxide material, wherein X comprises at least one of Ta, Si, Ru, Ti, B, Cu, Ni, V, Mo, Mn; and
      an amount of Co in one of the plurality of magnetic recording layers closest to a substrate is greater than an amount of Co in three other of the plurality of magnetic recording layers.

2. The magnetic recording medium of claim 1, wherein the plurality of magnetic recording layers comprises more than four magnetic recording layers and the plurality of nonmagnetic exchange coupling layers comprises more than three nonmagnetic exchange coupling layers.

3. The magnetic recording medium of claim 1, wherein a total thickness of the recording layer structure is twelve nanometers to twenty nanometers.

4. The magnetic recording medium of claim 1, wherein at least one of the plurality of magnetic recording layers comprises one or more of Co, Cr, Fe, Ta, Ni, Mo, Pt, W, Cr, Ru, Ti, Si, O, V, Nb, Ge, B, and Pd.

5. The magnetic recording medium of claim 1, wherein each of the plurality of nonmagnetic exchange coupling layers comprises a saturation magnetization of less than or equal to 100 emu/cc.

6. The magnetic recording medium of claim 1, wherein an amount of Co in at least one of the plurality of nonmagnetic exchange coupling layers is less than the amount of Co in at least one of the plurality of magnetic recording layers.

7. The magnetic recording medium of claim 1, wherein a thickness of each of the plurality of nonmagnetic exchange coupling layers is in a range of half nanometers to two nanometers.

8. The magnetic recording medium of claim 1, wherein a thickness of each of the plurality of nonmagnetic exchange coupling layers is the same.

9. The magnetic recording medium of claim 1, wherein a thickness of at least one of the plurality of nonmagnetic exchange coupling layers is different from the thickness of other ones of the plurality of nonmagnetic exchange coupling layers.

10. The magnetic recording medium of claim 1, further comprising:
    a soft underlayer structure; and
    an exchange break layer structure between the soft underlayer structure and the recording layer structure.

11. A data storage system comprising the magnetic recording medium of claim 1.

\* \* \* \* \*